US012636579B2

(12) United States Patent
Shao et al.

(10) Patent No.: US 12,636,579 B2
(45) Date of Patent: May 26, 2026

(54) DISPLAY APPARATUS AND METHOD FOR DISPLAY APPARATUS

(71) Applicant: HISENSE VISUAL TECHNOLOGY CO., LTD., Qingdao (CN)

(72) Inventors: Xiaoming Shao, Qingdao (CN); Wenxiao Liu, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 215 days.

(21) Appl. No.: 18/649,143

(22) Filed: Apr. 29, 2024

(65) Prior Publication Data

US 2024/0278123 A1 Aug. 22, 2024

Related U.S. Application Data

(63) Continuation of application No. PCT/CN2022/120518, filed on Sep. 22, 2022.

(30) Foreign Application Priority Data

Oct. 29, 2021 (CN) .......................... 202111271552.2
Dec. 23, 2021 (CN) .......................... 202111588221.1

(51) Int. Cl.
*A63F 13/533* (2014.01)
*A63F 13/22* (2014.01)

(52) U.S. Cl.
CPC ............ *A63F 13/533* (2014.09); *A63F 13/22* (2014.09)

(58) Field of Classification Search
CPC ........ A63F 13/533; A63F 13/22; A63F 13/25; A63F 13/26; G06F 3/01; H04N 21/442; H04N 21/478
See application file for complete search history.

(56) References Cited

U.S. PATENT DOCUMENTS

| | | | | |
|---|---|---|---|---|
| 9,058,059 B2 * | 6/2015 | Sakai | ...................... | G06F 21/31 |
| 11,322,077 B1 * | 5/2022 | Chun | ................... | G09G 3/3208 |
| 12,513,361 B2 * | 12/2025 | Lu | ................... | H04N 21/440272 |
| 2009/0186693 A1 * | 7/2009 | Panoff | .................... | A63F 13/45 |
| | | | | 463/31 |
| 2011/0170745 A1 * | 7/2011 | Chen | ...................... | G06F 3/042 |
| | | | | 382/103 |
| 2012/0260198 A1 * | 10/2012 | Choi | .................. | H04N 21/8173 |
| | | | | 715/761 |

(Continued)

FOREIGN PATENT DOCUMENTS

| | | |
|---|---|---|
| CN | 103995595 A | 8/2014 |
| CN | 104755308 A | 7/2015 |

(Continued)

OTHER PUBLICATIONS

English translation of Office Action issued in CN202111271552.2, mailed Mar. 27, 2024.

*Primary Examiner* — Dmitriy Bolotin
(74) *Attorney, Agent, or Firm* — Meunier Carlin & Curfman LLC

(57) ABSTRACT

The present application provides a display apparatus and a method. The method includes: when the display apparatus receives a first display command from the user, the display apparatus displays the game information in the first region on the game interface, and after receiving a first adjustment command from the user, adjusts the display region and/or the display item(s) of the game information on the game interface.

18 Claims, 21 Drawing Sheets

(56) References Cited

U.S. PATENT DOCUMENTS

| | | | |
|---|---|---|---|
| 2016/0368382 A1 | 12/2016 | Schlittenbauer et al. | |
| 2021/0046384 A1* | 2/2021 | Kurabayashi | A63F 13/23 |
| 2021/0149558 A1 | 5/2021 | Qian et al. | |
| 2021/0402302 A1* | 12/2021 | Eads | A63F 13/537 |
| 2024/0061547 A1* | 2/2024 | Fleizach | G06F 3/04815 |

FOREIGN PATENT DOCUMENTS

| | | | |
|---|---|---|---|
| CN | 104793749 A | 7/2015 |
| CN | 106547354 A | 3/2017 |
| CN | 107261498 A | 10/2017 |
| CN | 108874136 A | 11/2018 |
| CN | 109663353 A | 4/2019 |
| CN | 110069137 A | 7/2019 |
| CN | 111461059 A | 7/2020 |
| CN | 112791388 A | 5/2021 |
| JP | 2001246161 A | 9/2001 |

* cited by examiner

<u>100</u>

<u>100</u>

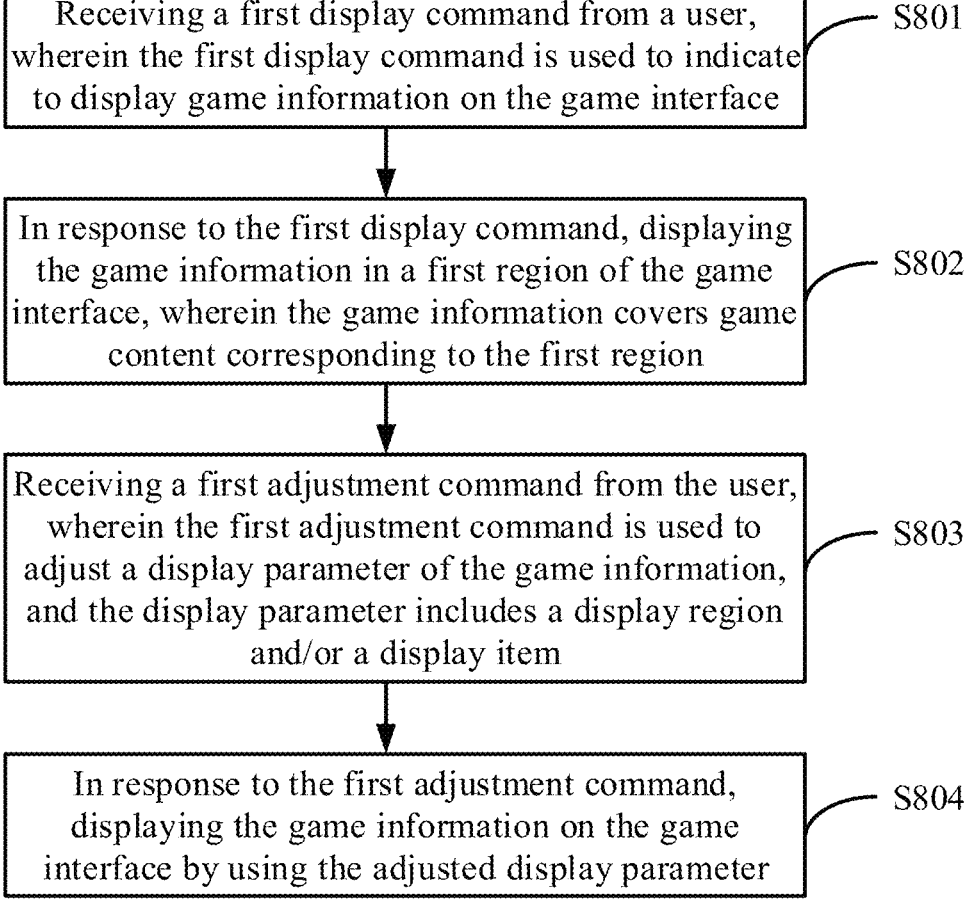

Receiving a first display command from a user, wherein the first display command is used to indicate to display game information on the game interface          S801

In response to the first display command, displaying the game information in a first region of the game interface, wherein the game information covers game content corresponding to the first region          S802

Receiving a first adjustment command from the user, wherein the first adjustment command is used to adjust a display parameter of the game information, and the display parameter includes a display region and/or a display item          S803

In response to the first adjustment command, displaying the game information on the game interface by using the adjusted display parameter          S804

FIG. 8

Number of
bullets

Timer
name

Teammate
information

EXTRAS SET UP

FIG. 11 n                                    o

Obtaining an image captured by a camera in real time, and recognizing a first gesture in the image ⟋ S100

↓

Determining a first gesture position of the first gesture ⟋ S200

↓

Determining a gesture recognition region ⟋ S300

↓

Determining whether the first gesture position is within the gesture recognition region ⟋ S400 — No → Not generating the command ⟋ S500

Yes ↓

Determining the position of the controlled character according to the first gesture position, and moving the controlled character displayed on the display according to the position of the controlled character ⟋ S600

FIG. 24

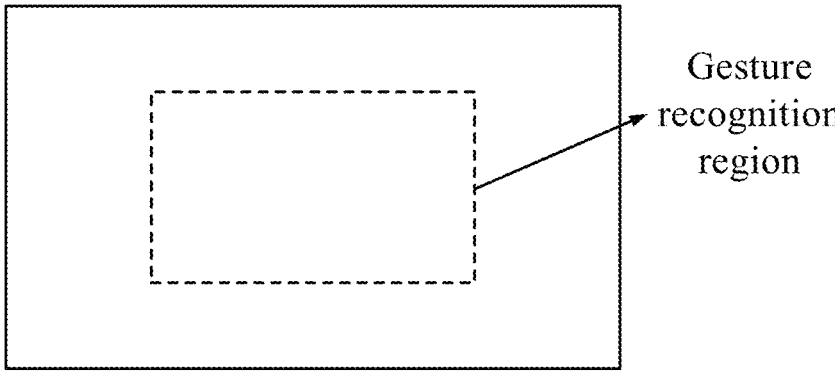

Gesture recognition region

FIG. 25

First
longitudinal
boundary

Second
longitudinal
boundary

DISPLAY APPARATUS AND METHOD FOR DISPLAY APPARATUS

CROSS REFERENCES TO RELATED APPLICATIONS

The present application is a continuation application of PCT/CN2022/120518, filed on Sep. 22, 2022, which claims the priority to Chinese Patent Application No. 202111588221.1, filed on Dec. 23, 2021; and Chinese Patent Application No. 202111271552.2, filed on Oct. 29, 2021, the entire contents of which are incorporated by reference in entireties.

TECHNICAL FIELD

The present application relates to the technical field of intelligent display apparatuses, in particular to a display apparatus and a method for the display apparatus.

BACKGROUND

Display apparatuses can refer to terminal devices capable of outputting specific display images, which may be terminal devices such as smart TVs (televisions), mobile terminals, smart advertising screens, and projectors. Taking a smart TV as an example, the smart TV is based on Internet application technology, has an open operating system and chip, has an open application platform, can realize two-way human-computer interaction, and is a TV product integrating multiple functions such as audio-visual, entertainment, and data, etc., which is used to meet the diverse and individual requirements of users.

SUMMARY

The present application provides a display apparatus and a method for the display apparatus.

In a first aspect, the present application provides a display apparatus, including: a display, configured for displaying an image from a broadcast system or an external device; a communicating device, including one or more HDMI ports and configured for connecting with the external device; at least one processor in connection with the display and the communicating device and configured to execute instructions to cause the display apparatus to perform: receiving a first display command for displaying game information on an game interface from a user, wherein the game interface is associated with game content input via a HMDI port; in response to the first display command, displaying the game information in a first region of the game interface, wherein the game information covers a first portion of game content corresponding to the first region; receiving a first adjustment command for adjusting a display parameter of the game information from the user, wherein the display parameter includes a display region and/or a display item; and in response to the first adjustment command, displaying the game information on the game interface by using the adjusted display parameter.

In a second aspect, the present application provides a method for a display apparatus, including: receiving a first display command for displaying game information on an game interface from a user, wherein the game interface is associated with game content input via a HMDI port; in response to the first display command, displaying the game information in a first region of the game interface, wherein the game information covers a first portion of game content corresponding to the first region; receiving a first adjustment command for adjusting a display parameter of the game information from the user, wherein the display parameter includes a display region and/or a display item; and in response to the first adjustment command, displaying the game information on the game interface by using the adjusted display parameter.

BRIEF DESCRIPTION OF FIGURES

FIG. 8 illustrates a schematic flow diagram of adjusting a display parameter of game information according to some embodiments.

FIG. 11 illustrates a schematic diagram of displaying game information in a first region in the display apparatus according to some embodiments.

FIG. 24 illustrates a flowchart of a method for controlling a position of a controlled character through a gesture according to some embodiments.

FIG. 25 illustrates a schematic diagram of a gesture recognition region in an image according to some embodiments.

DETAILED DESCRIPTION

In order to make the purpose and implementation of the application clearer, the exemplary embodiments of the application will be clearly and completely described as below in conjunction with the accompanying drawings in the exemplary embodiments of the application. Obviously, the described exemplary embodiments are only some, but not all of the embodiments of the present application.

It should be noted that the brief description of the terms in the present application is only for the convenience of understanding the embodiments described below, and is not intended to limit the embodiments of the present application. These terms are to be understood according to their ordinary and plain meaning unless otherwise stated.

Figure 1:
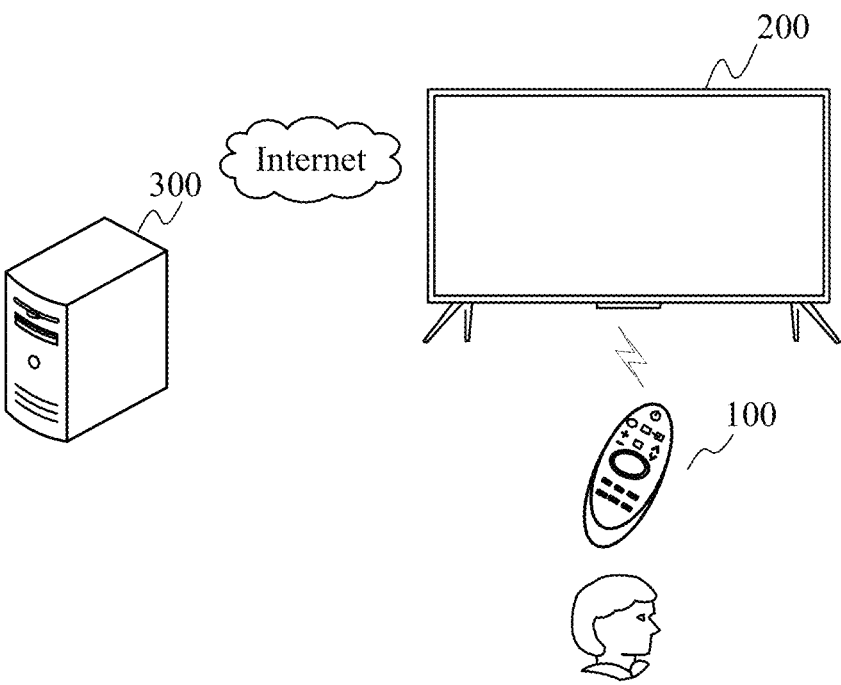
FIG. 1 illustrates a usage scenario of a display apparatus according to some embodiments.

FIG. 1 illustrates a schematic diagram of a usage scenario of a display apparatus according to some embodiments. As shown in FIG. 1, the display apparatus 200 can communicate with a server 300 through the Internet, and the user can operate the display apparatus 200 through a control device 100.

In some embodiments, the control device 100 may be a remote controller, and the communication between the remote controller and the display apparatus includes at least one of infrared protocol communication, Bluetooth protocol communication, or other short-distance communication modes. The display apparatus can be controlled wirelessly or wiredly. The user can control the display apparatus 200 by inputting at least one command through buttons on the remote control, voice input, or control panel input, etc.

Figure 2:
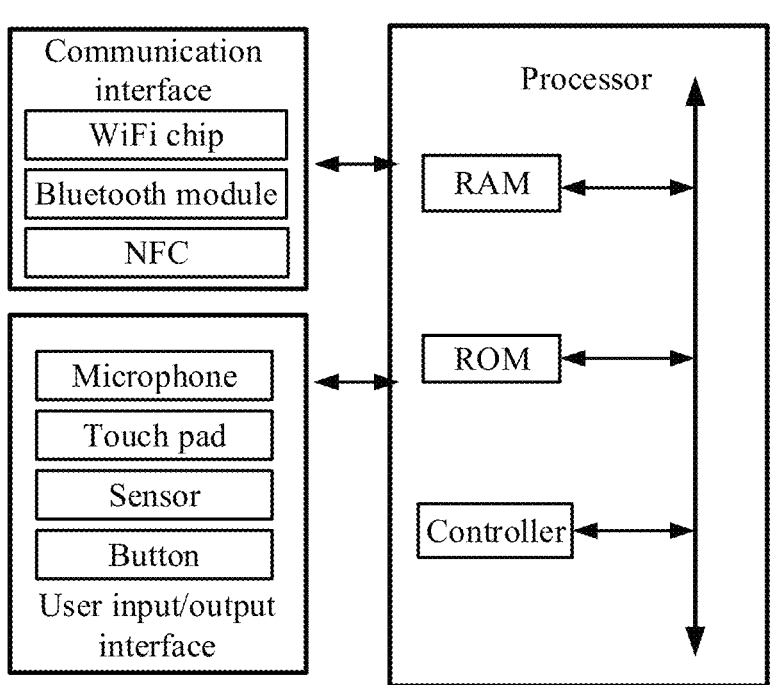
FIG. 2 illustrates a block diagram of a hardware configuration of a control device according to some embodiments.

In some embodiments, the control device 100 can also be a mobile terminal, such as a mobile phone, etc., and the communication between the mobile terminal and the display apparatus 200 includes at least one of Internet protocol communication or Bluetooth protocol communication, other short-distance communication, or long-distance communication modes, etc. The user can control the display apparatus 200 by inputting user commands through at least one command through buttons on the mobile terminal, voice input, or control panel input. FIG. 2 illustrates a configuration block diagram of the control device 100 taking a remote controller as an example. As shown in FIG. 2, the control device 100 includes a processor, a communication interface, a user input/output interface, a memory, and a power supply.

Figure 3:
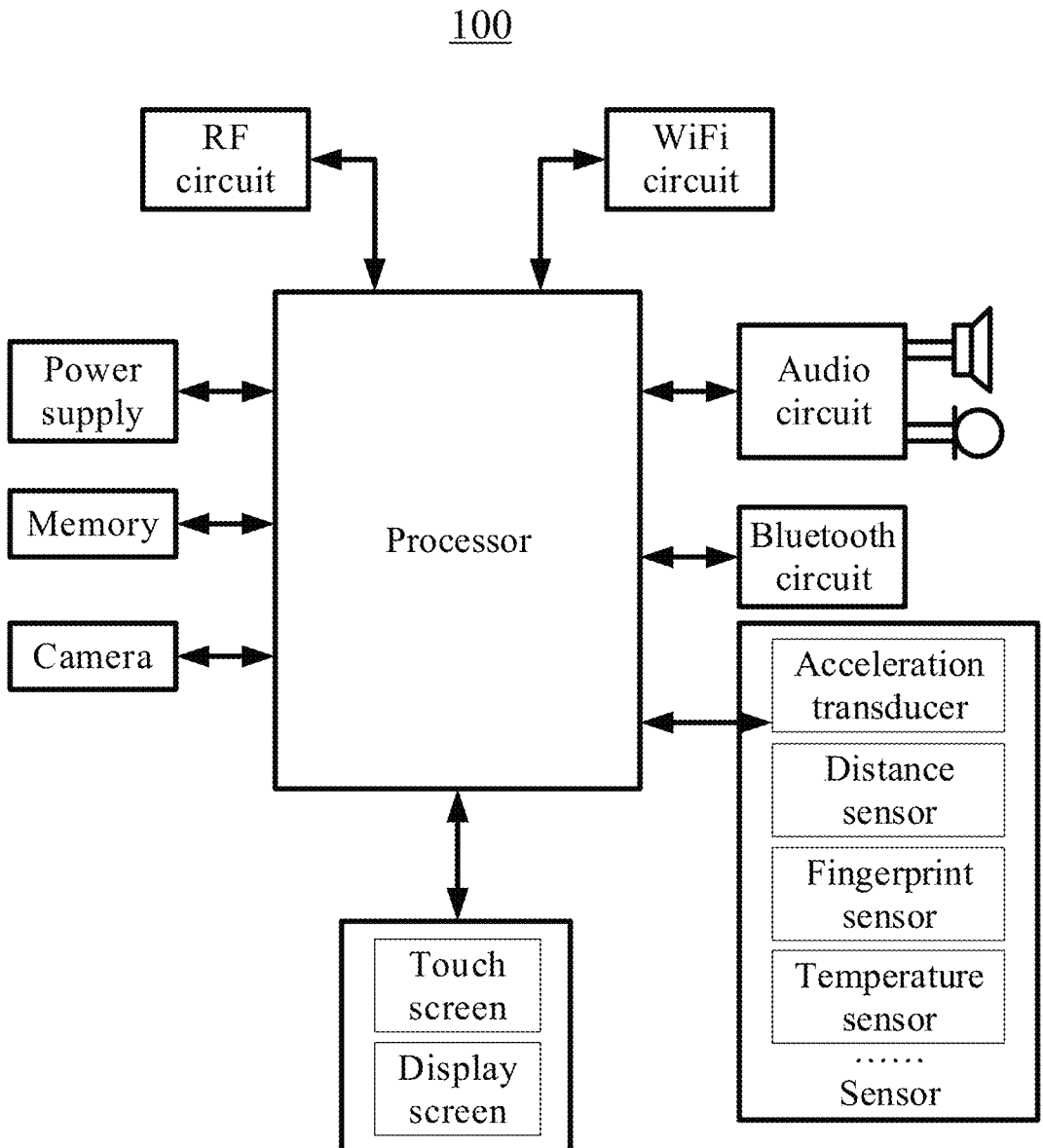
FIG. 3 illustrates a block diagram of a hardware configuration of a control device according to some embodiments.

FIG. 3 illustrates a configuration block diagram of the control device 100 taking a mobile terminal as an example. As shown in FIG. 3, the control device 100 includes at least one of components such as a radio frequency (radio frequency, RF) circuit, a memory, a display unit, a camera, a sensor, an audio circuit, a wireless fidelity (Wireless Fidelity, Wi-Fi) circuit, a processor, a Bluetooth circuit, or a power supply.

Figure 4:
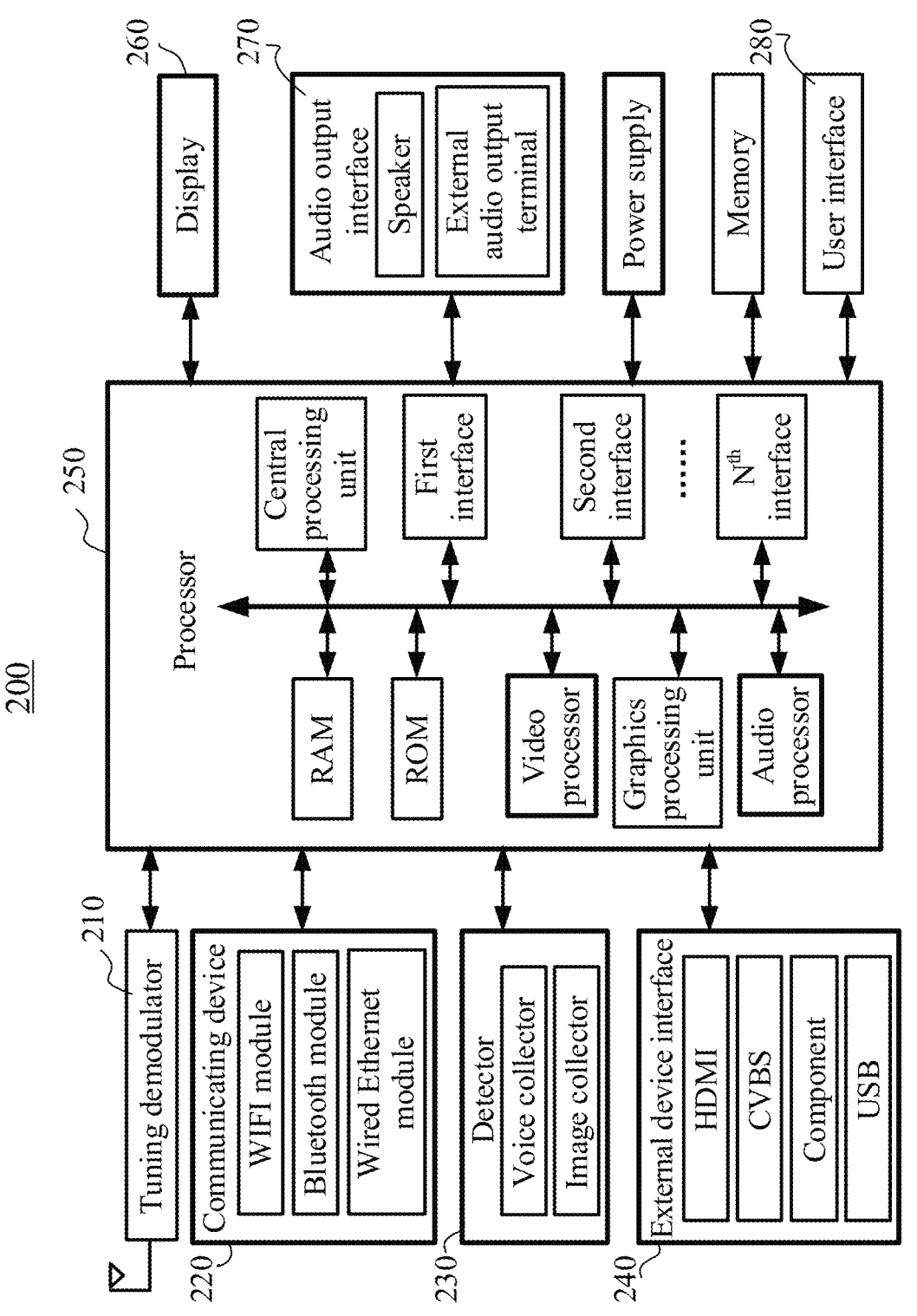
FIG. 4 illustrates a block diagram of a hardware configuration of a display apparatus according to some embodiments.

FIG. 4 illustrates a block diagram of a hardware configuration of a display apparatus 200 according to exemplary embodiments.

In some embodiments, the display apparatus 200 includes at least one of a tuning demodulator 210, a communicating device 220, a detector 230, an external device interface 240, a processor 250, a display 260, an audio output interface 270, a memory, a power supply, or a user input interface 280.

In some embodiments, the communicating device 220 is a component for communicating with an external device(s) or a server(s) according to various communication protocols. For example, the communicating device may include at least one of a Wi-Fi module, a Bluetooth module, a wired Ethernet module and other network communication protocol chips or near field communication protocol chips, or an infrared receiver. The display apparatus 200 can establish transmission and reception of control signals and data signals with the control device 100 or the server 300 through the communicating device 220.

In some embodiments, the external device interface 240 may include, but is not limited to, any one or more interfaces of the following: High Definition Multimedia Interface (HDMI), Analog or Data High Definition Component (Component) Input Interface, Composite Video Broadcast Signal (CVBS) Input Interface, Universal Serial Bus (USB) Input Interface, or RGB port, etc., or may also be a composite input/output interface formed by the above-mentioned multiple interfaces.

In some embodiments, the processor 250 and the tuning demodulator 210 may be located in different separate devices, that is, the tuning demodulator 210 may also be located in an external device, e.g., an external set-top box, of the main device where the processor 250 is located.

In some embodiments, the processor 250 can control the operation of the display apparatus and respond to the user's operations through various software programs stored in the memory. The processor 250 can control the overall operations of the display apparatus 200. For example, in response to receiving a user command for selecting a UI object presented on the display 260, the processor 250 may perform an operation related to the object selected by the user command.

In some embodiments, the user can input a user command through a graphical user interface (GUI) displayed on the display 260, and the user input interface receives a user input command through the GUI. Alternatively, the user may input a user command by inputting a specific sound or gesture, and the user input interface receives the user input command by recognizing the sound or gesture through a sensor.

Figure 5:
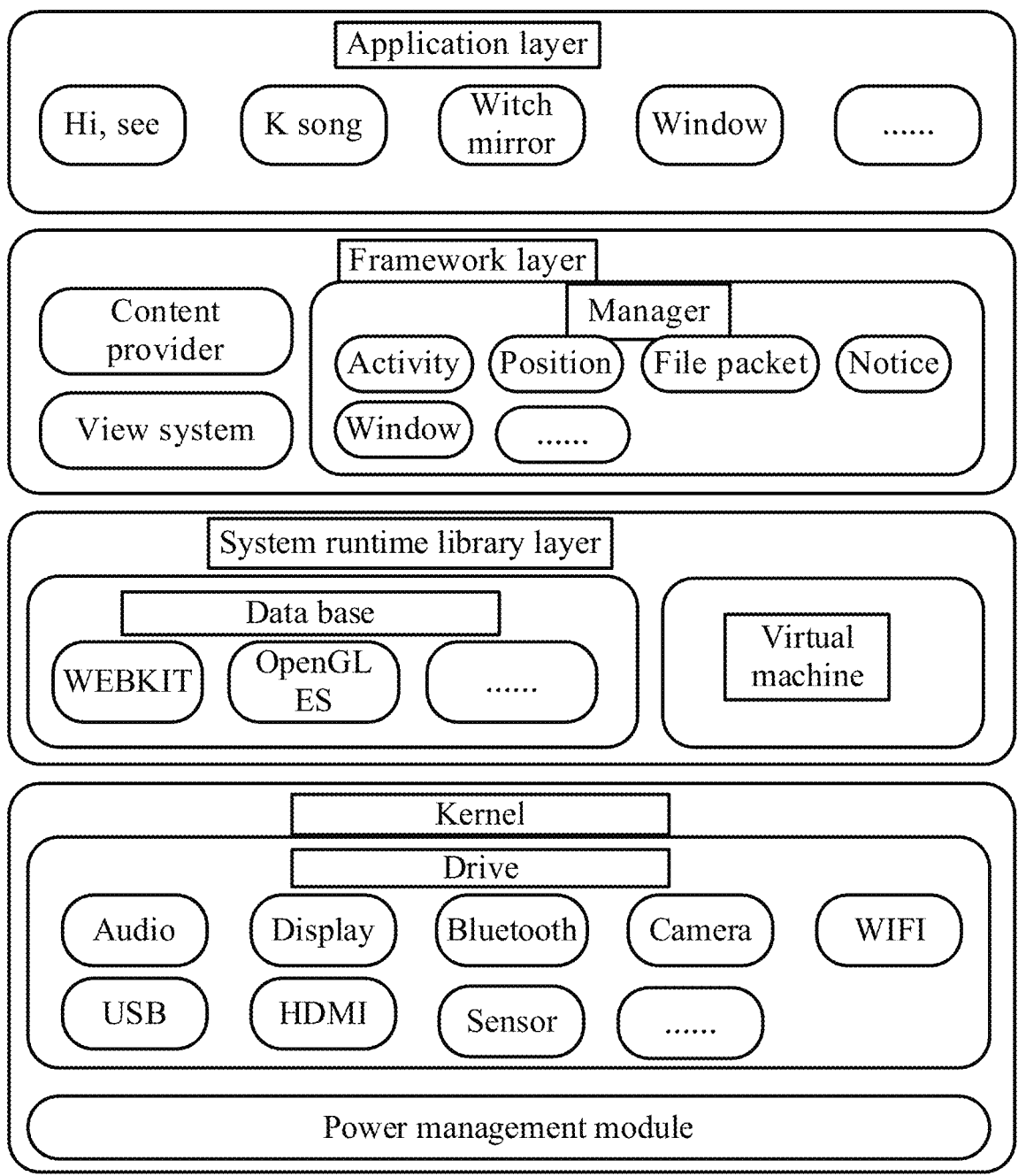
FIG. 5 illustrates a block diagram of a software configuration of a display apparatus according to some embodiments.

Referring to FIG. 5, in some embodiments, the system can be divided into four layers, i.e., an application (Applications) layer, an application framework layer (referred to as "framework layer"), an Android runtime and system library layer (referred to as "system runtime library layer"), and a kernel layer from top to bottom.

In some embodiments, there is at least one application running in the application layer, and the at least one application can be a window (Window) application, system setting application or clock application etc., that build in operating system, or can also be application(s) developed by the third-party developer. During specific implementation, the application packages in the application layer are not limited to the above examples.

The framework layer can provide an application programming interface (application programming interface, API) and a programming framework for applications in the application layer. The application framework layer can include some predefined functions. The application framework layer can be regarded to be equivalent to a processing center, which decides to make the applications in the application layer to take actions. Through the API, the application can access the resources in the system and obtain the services of the system during running.

As shown in FIG. 5, the application framework layer in the embodiments of the present application can include managers (Managers), content provider (Content Provider) etc. The manager(s) can include at least one of the following modules: an activity manager configured to interact with all activities which are running in the system; a location manager configured to provide system services or applications with access to system location services; a package manager configured to retrieve various information related to the application package currently installed on the apparatus; a notification manager configured to control the display and clearing of notification messages; a window manager configured to manage icons, windows, toolbars, wallpapers and desktop widgets on the user interface.

When a user plays a game through the display apparatus 200, the display apparatus 200 will display game content corresponding to the game being played. On the game interface shown in FIG. 6, the important information, i.e., specified information, e.g., "number of bullets", "equipment name", "teammate information", etc., in the game can be fixedly displayed in a left middle region (shown in a dotted line box) on the game interface. In this embodiment, the specified information of the game is determined by the specific game and is set based on the game itself, and the display region of the specified information on the game interface is also set based on the game itself. Thus, different games have different specified information, and the specified information of different games is displayed in different regions on the game interface.

In order to improve the user's game experience, the display apparatus 200 can be configured to provide some auxiliary functions to assist the user to better enjoy the game. In this embodiment, parameter information corresponding to these auxiliary functions may be referred to as game information. The game information is not the design of the game itself, and can be added to the game interface by a native mode of calling the operating system of the display apparatus 200, so it will not affect the operation of the game itself.

Figure 6:
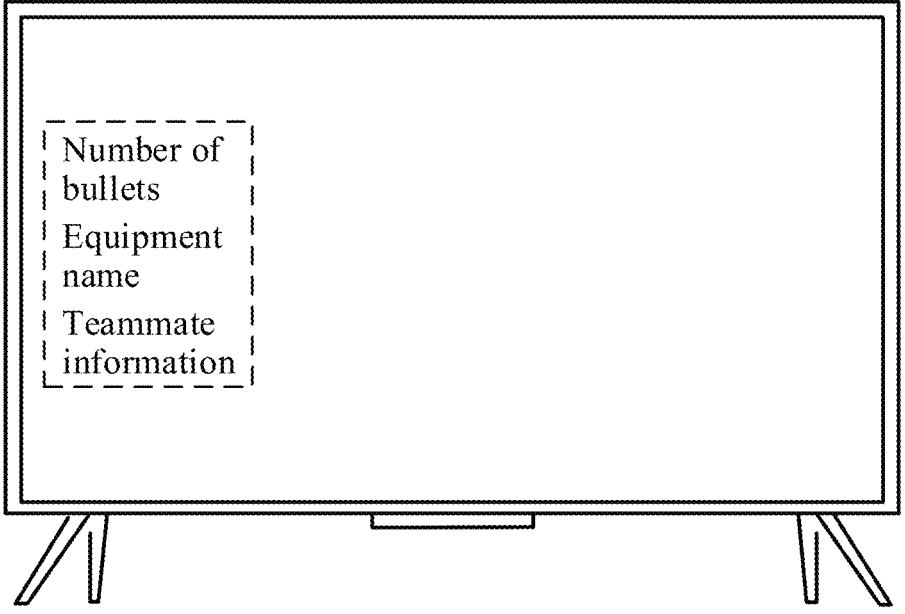
FIG. 6 illustrates a schematic diagram of a game interface according to some embodiments.
Figure 7:
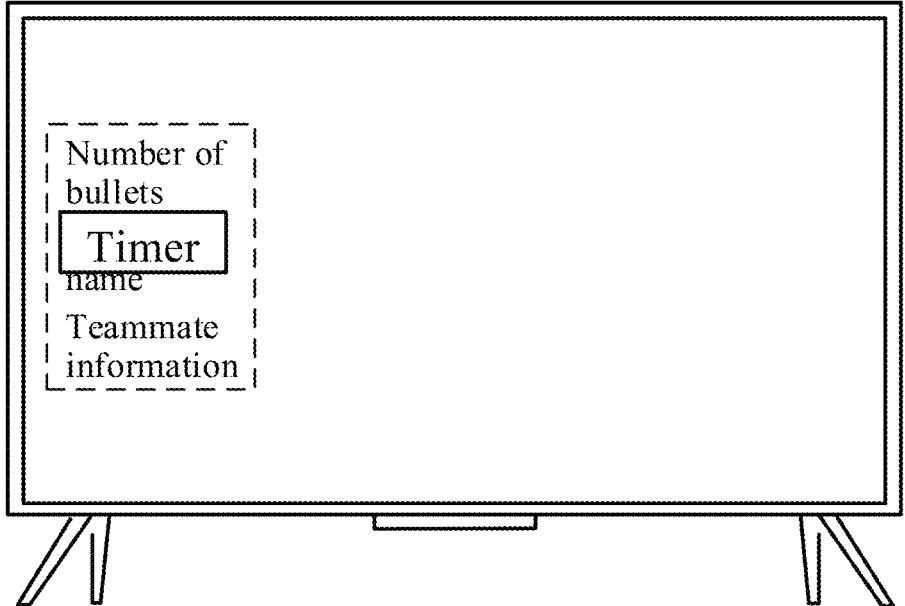
FIG. 7 illustrates a schematic diagram for showing game information covering specified information according to some embodiments.

Usually, the display region of game information on the game interface is relatively fixed, that is, no matter which game it is, the game information will be displayed in a fixed region on the game interface, as shown in FIG. 7, displayed in the left middle region on the game interface. By this way, the game information will cover the game content in this region, so that the user can only see the game information in this region, but cannot see the game content located in this region. For some games, if the game content corresponding to this region does not include specified information, it means that the game content corresponding to this region is not important, and even if the game content corresponding to this region is covered by game information, it will not affect the user's game experience. However, for some games, if the game content corresponding to this region includes specified content, e.g., the game interface as shown in FIG. 6, specified information "number of bullets", "equipment name", "teammate information", etc., included in the left middle region on the game interface, it means that the game content corresponding to this region is very important. Once the game content (specified information) in this region is covered by the game information, it will seriously affect the user's game experience. Moreover, the game information usually includes fixed display items. As shown in FIG. 7, the game information includes a display item "timer", and the "timer" only has a count-up function, that is to say, the game information can only provide the user with the count-up function in the game. However, for some games, they have the count-up function themselves, or they have nothing to do with the game time, and the user does not need to start the count-up function at all, or they themselves need other auxiliary functions, such as the "refresh rate" function to assist the user to adjust the refresh rate in real time. By this way, since the fixed display item(s) in the game information does not include the "refresh rate", the game information will not be able to provide the user with the "refresh rate" function in the game, so as not to assist the user to improve the game experience.

In view of the above-mentioned issues existing in the game information, embodiments of the present application provide a display method of game information to flexibly adjust display parameters (display region and display item(s)) of the game information, which can refer to a flow shown in FIG. 8, and is specifically described as follows.

S801, receiving a first display command from a user, wherein the first display command is used to indicate to display game information on the game interface.

The user can play a game through the display apparatus 200, and in this case, the display apparatus 200 can display a game interface corresponding to game content of the game.

When a user needs an auxiliary function, he/she may send a first display command to the display apparatus 200 to make the display apparatus show the game information. For example, the user may send the first display command to the display apparatus through the control device, such as a remote controller or a mobile phone.

Correspondingly, the display apparatus can receive the first display command from the user through an interface, a network, or the like.

S802, in response to the first display command, displaying the game information in a first region of the game interface, wherein the game information covers game content corresponding to the first region.

After receiving the first display command from the user, the display apparatus 200 can, in response to the first display command, display the game information on the game interface.

In this embodiment, the display region of the game information may be a fixed display region, which is the first region in this embodiment, of the game interface, and the display item(s) in the game information can also be a fixed display item(s). In response to the first display command, the display apparatus 200 first obtains the pre-stored display parameters, the pre-stored display parameters can include information about the fixed display region and the fixed display item(s), and then display the game information in the first region. By this way, the game information can include related information of the fixed display item(s), such as an item name of the fixed display item(s) and a parameter(s) corresponding to the fixed display item(s).

In this embodiment, the game information can be shown in the first region in the form of cover, that is, the game information covers the game content corresponding to the first region, so that the user can only see the game information in the first region, but cannot see the game content information in the first region.

S803, receiving a first adjustment command from the user, wherein the first adjustment command is used to adjust a display parameter of the game information, and the display parameter includes a display region and/or a display item.

The user can adjust the display parameter(s) of the game information by sending the first adjustment command to the display apparatus 200. In this embodiment, the display parameter(s) of the game information can include the display region and the display item(s), and the user can adjust the display region of the game information on the game interface or adjust the display item(s) in the game information, or adjust the display region of the game information on the game interface and adjust the display item(s) in the game information at the same time.

In this embodiment, it is not limited that the adjusted display parameter is different from the original display parameter. In some embodiments, if the user opens a setting menu of the display parameter(s) of the game information by misoperation, he/she can still indicate the same display parameter(s) as the original display parameter(s) through the first adjustment command, that is, the adjusted display parameter(s) is the same as the original display parameter(s). so as to end the misoperation. Alternatively, the user can indicate the adjusted display parameter(s) through the first adjustment command, the adjusted display parameter(s) can be set according to user requirements, etc., and through the first adjustment command, it can be ensured that the display parameter(s) of the game information is the adjusted display parameter(s). Only in this embodiment, the adjusted display parameter(s) is exactly the same as the original display parameter(s).

S804, in response to the first adjustment command, displaying the game information on the game interface by using the adjusted display parameter.

After receiving the first adjustment command, the display apparatus can recognize the adjusted display parameter(s), e.g., the adjusted display region, or the adjusted display item(s), or the adjusted display region and display item(s), carried in the first adjustment command. After the display apparatus 200 recognizes the adjusted display parameter(s), it uses the adjusted display parameter(s) to display the game information.

For example, if the adjusted display parameter(s) includes the adjusted display region, the game information is displayed in the adjusted display region, and at this time, the display item(s) in the game information remains unchanged.

If the adjusted display parameter(s) includes the adjusted display item(s), the game information corresponding to the adjusted display item(s) is displayed, and at this time, the display region of the game information remains unchanged.

If the adjusted display parameter(s) includes the adjusted display region and the adjusted display item(s), the game information is shown in the adjusted display region, and the displayed game information corresponds to the adjusted display item(s).

Figure 9:
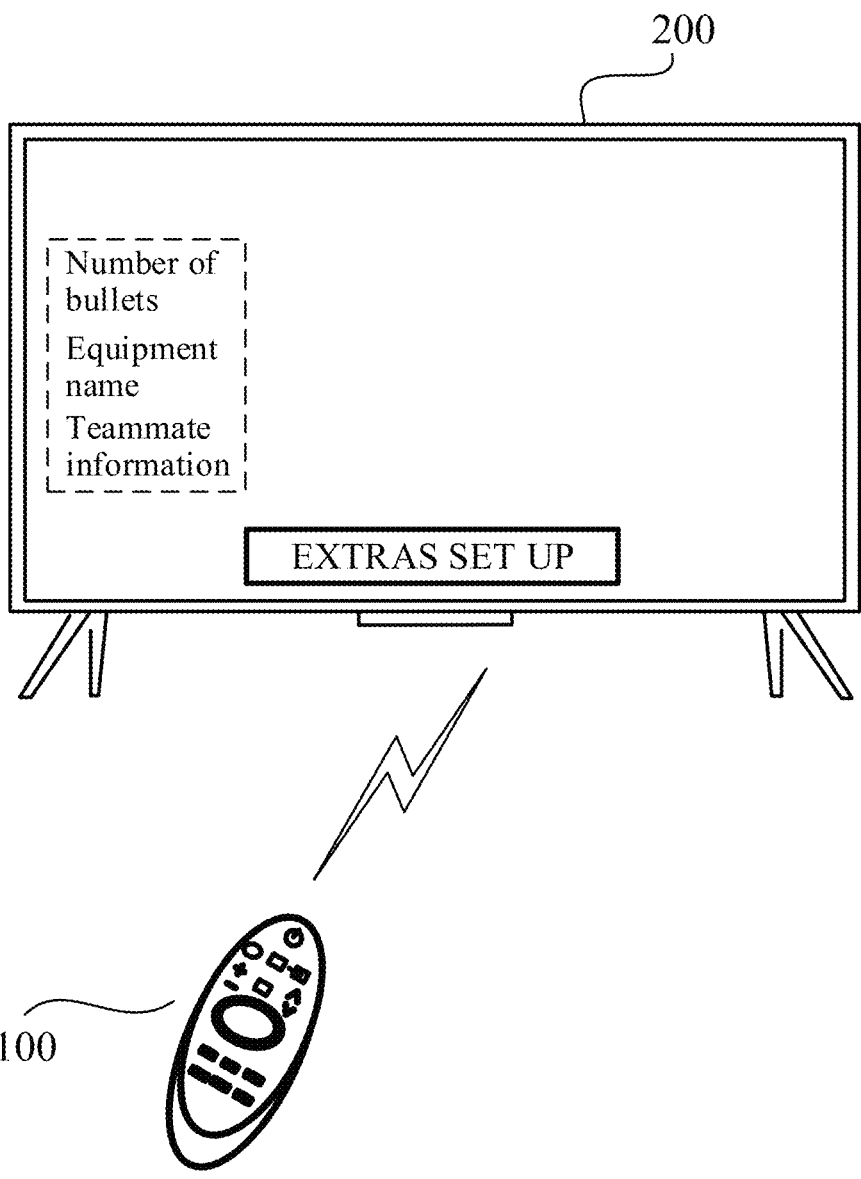
FIG. 9 illustrates a schematic diagram of an interaction between a user and a display apparatus to display a main menu through a control device according to some embodiments.
Figure 10:
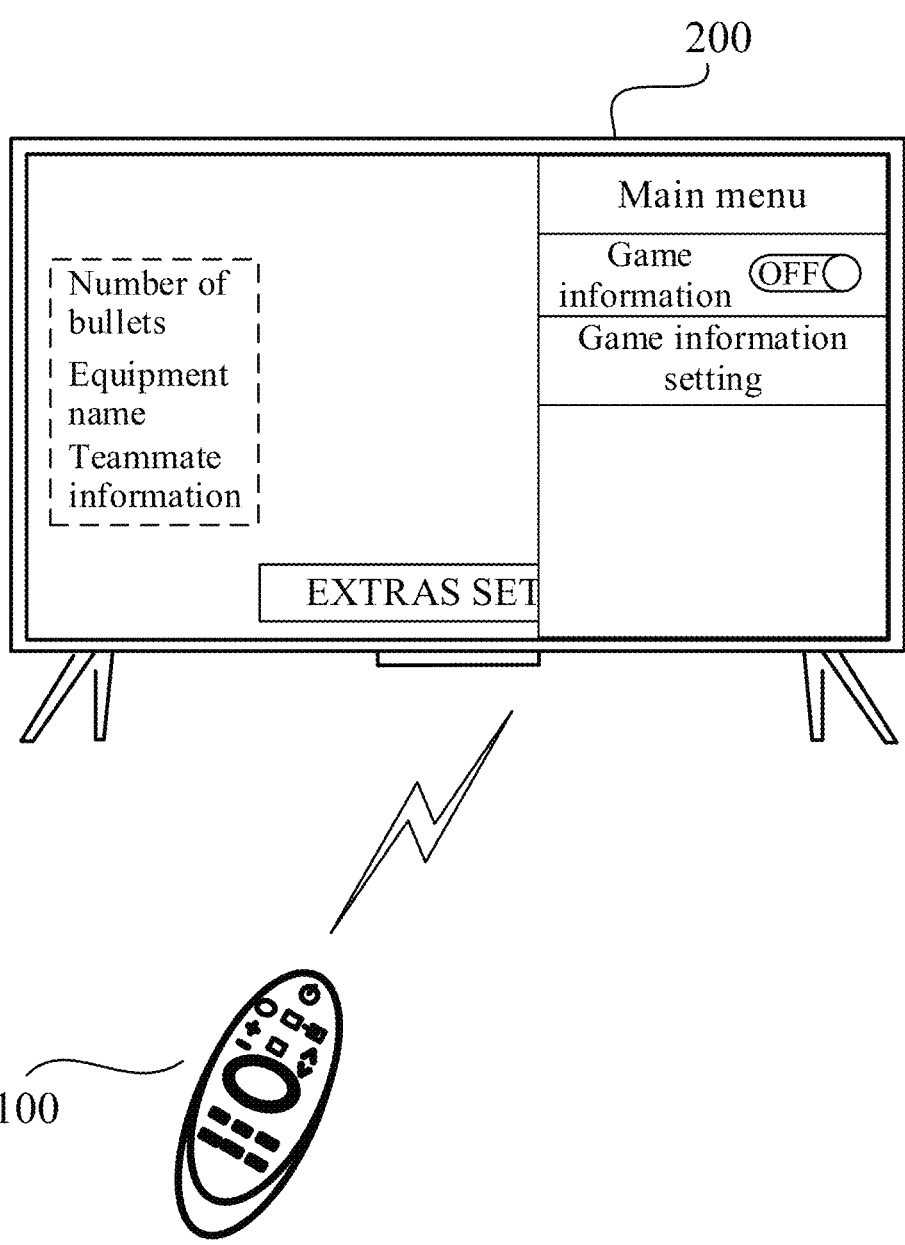
FIG. 10 illustrates a schematic diagram of an interaction between a user and a display apparatus to display game information through a control device according to some embodiments.
Figure 11:
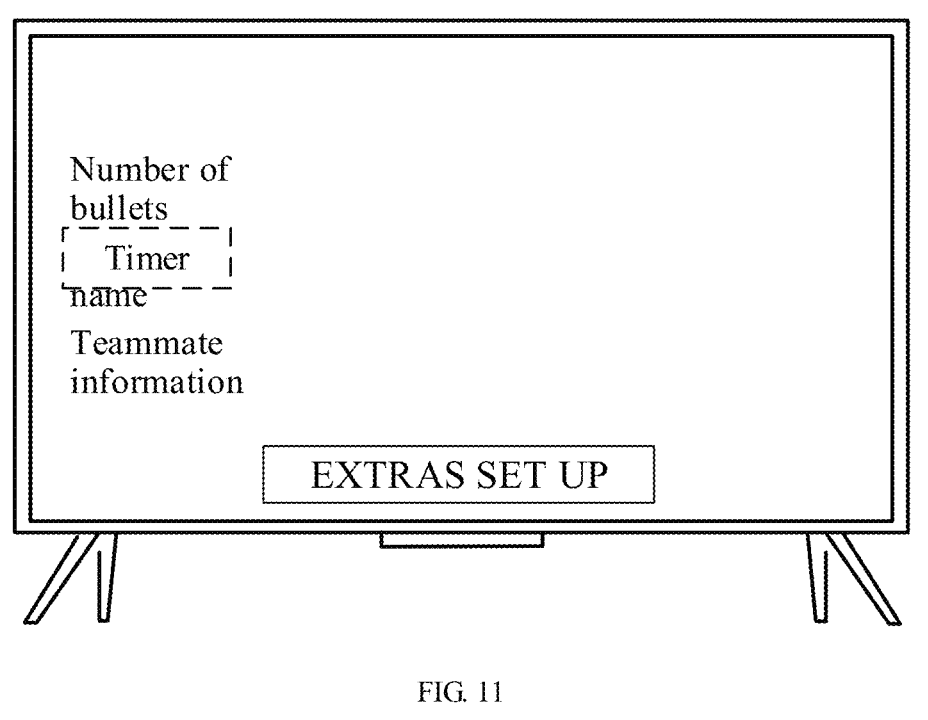

For example, FIGS. 9 to 11 provide a flow for displaying game information through interaction between the user and the display apparatus, which will be discussed below.

As shown in FIG. 9, in this example, the control device 100 is a remote control, and the user moves a focus (shown in a thick black solid line box) to a setting key "EXTRAS SET UP" on the game interface to send a command for displaying a main menu to the display apparatus 200 by controlling the remote control, such as by pressing "up", "down", "left" and "right" buttons on the remote control and pressing a "confirm" button on the remote control. In some examples, a "menu" button can be set separately on the remote controller, and the user can send a command for displaying a menu to the display apparatus 200 by directly pressing the "menu" button.

As shown in FIG. 10, the display apparatus 200 receives the command for displaying main menu issued from the user, and displays a main menu on the game interface. In this embodiment, the main menu at least includes a switch of game information and an option of game information setting. By pressing the "up" and "down" buttons on the remote controller, the user can move the focus (shown in the thick black solid line) to the switch of game information, and by pressing the "confirm" button on the remote controller, the user sends the first display command to the display apparatus 200 to indicate the display apparatus 200 to turn on the switch of game information, that is, to display the game information on the game interface.

In this embodiment, when the game is started by default, the switch of game information is turned off. Therefore, it is necessary for the user to send the first display command to the display apparatus 200 according to the above flow, so as to make the display apparatus 200 display the game information. In some embodiments, the system can open the game room by default, and the switch of game information is on. Thus, the above-described flow for displaying the game information can be omitted.

As shown in FIG. 11, after receiving the first display command sent from the user, the display apparatus 200 can obtain a pre-stored fixed display region, i.e., the first region (shown in a dotted line box) on the game interface, wherein the first region is located in the middle of the left side of the game interface. And the display apparatus 200 can obtain a pre-stored fixed display item such as a timer, and display the game information (the timer and its related information) in the first region. In an embodiment, the item name(s) of the displayed item(s) in the game information may be presented in text form. In another embodiment, in order to reduce the occupied area, the item name(s) of the display item(s) in the game information may be presented in the form of icons as shown in FIG. 11.

In this embodiment, in the middle on the left side on the game interface, i.e., in the first region, the game content includes specified information, such as "number of bullets", "equipment name" and "teammate information", and the game information displayed in the first region just covers the specified information happens, which makes the user unable to play the game normally.

Figure 12:
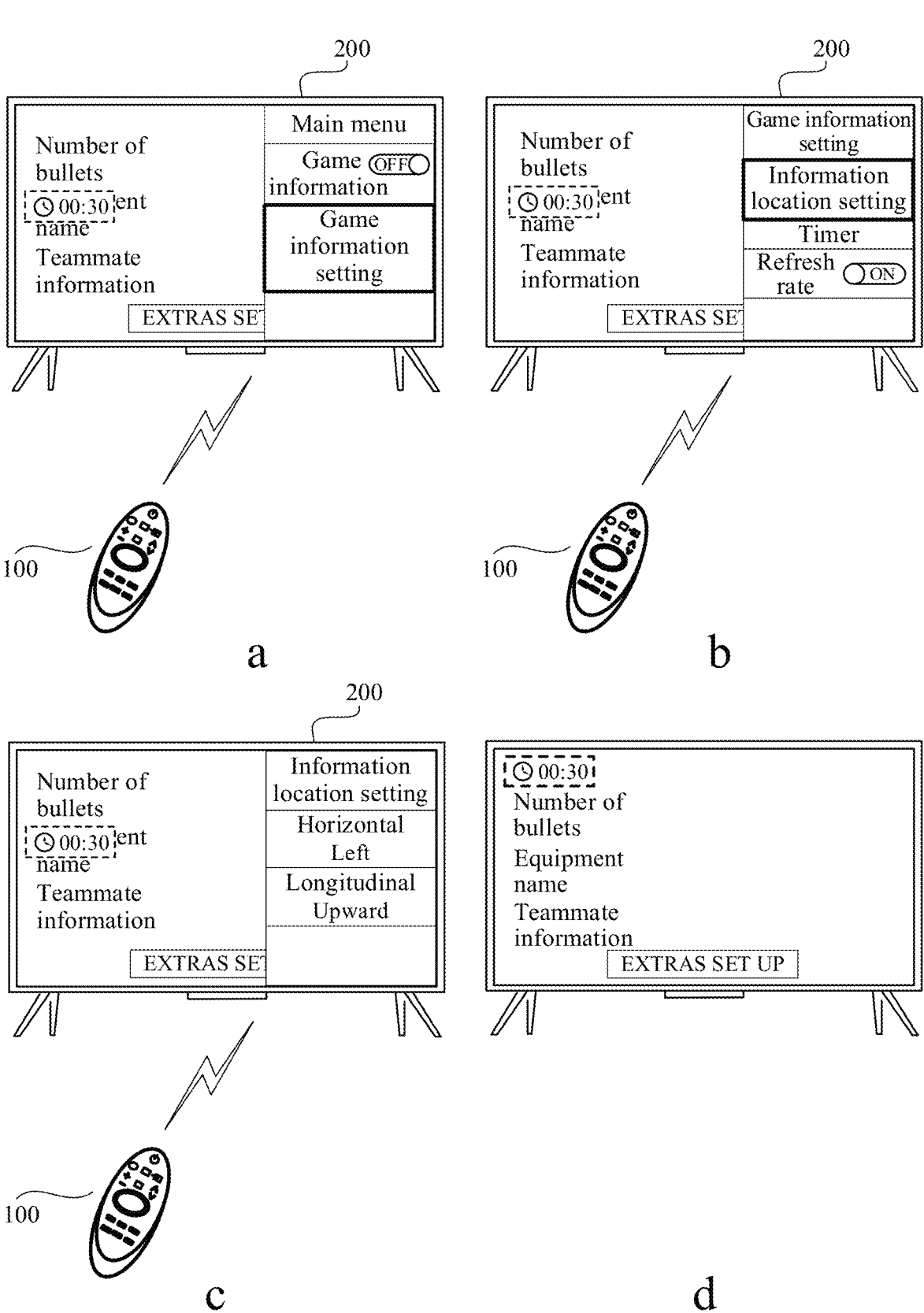
FIG. 12 illustrates a schematic diagram of interaction between a user and a display apparatus to adjust a display region of game information according to some embodiments.

FIG. 12 illustrates a flow for adjusting the display region of game information between the user and the display apparatus, which will be discussed below.

Based on the main menu shown in FIG. 10, as shown in "a" in FIG. 12, by pressing the "up" and "down" buttons on the remote control, the user can move the focus (shown in the thick black solid line) to the option of game information setting, and by pressing the "confirm" button on the remote controller, a selection command is issued to the display apparatus 200 to display a game information menu corresponding to the option of game information setting on the current game interface, wherein the game information menu includes options of all display items and an option of information location setting.

As shown in b in FIG. 12, by pressing the "up" and "down" buttons on the remote controller, the focus is moved (shown in the thick black solid line box) to the option of information location setting, and by pressing the "confirm" button on the remote controller, a selection command is issued to the display apparatus 200 to display an information location menu on the current game interface, wherein the information location menu has selectable options or options which can be modified.

Usually, in most games, the top and bottom on the game interface are key regions to improve user's visual experience, so some auxiliary information is usually not displayed in these regions. Thus, the set game information can be selected to be displayed on the left (upper left, middle left, lower left) and right (upper right, middle right, lower right) on the game interface. For some embodiments, the region where game information can be displayed can be increased or decreased to meet different user requirements. As shown in c in FIG. 12, the information location menu includes two modifiable options, namely, a modifiable option for controlling displaying in the horizontal direction, and a modifiable option for controlling displaying in the longitudinal direction. Taking the game information can be presented on the left and right on the game interface as an example, the modifiable options for controlling the displaying in the horizontal direction have two modification options, i.e., left and right, and the modifiable options for controlling the displaying in the longitudinal direction have three modification options, i.e. up, middle, down. In this embodiment, in order to prevent the game information from covering the specified information in the game content, it is necessary to adjust the display region of the game information to a region on the game interface that does not contain the specified information, for example, a second region. Assuming that in this embodiment, only the specified information is included in the first region, the second region can be selected from the remaining five regions. the first adjustment command is issued to the display apparatus 200 by manipulating the remote control to modify the modifiable options for controlling the displaying in the horizontal direction and the modifiable options for controlling the displaying in the longitudinal direction. As shown in c in FIG. 12, the modifiable option for controlling the displaying in the horizontal direction is modified to left, and the modifiable option for controlling the displaying in the longitudinal direction is modified to up, then the second region is the upper left region on the game interface.

As shown in d in FIG. 12, the display apparatus 200, in response to the first adjustment command, displays the game information in the second region (shown in the thick dotted line box), at this time, the display item(s) in the game information remains unchanged, and is still timer.

Through the above adjustment of the display region, the game information can be adjusted to a display region that does not contain the specified information, so that the game information will not cover the specified information. So that the user can play the game normally and check the game information, so as to further improve the game experience.

In some embodiments, the user can move the game information to a new display region according to the change of the game content on the game interface, i.e., the change of the display region of the specified information and referring to the flow shown in FIG. 12.

In some embodiments, even if the first region does not contain specified information, the user can move the game information to a desired display region according to the flow shown in FIG. 12 and according to personal preferences or actual requirements when playing the game.

In the above example, the fixed display item in the game information is the timer. If the current game does not need the timer function, or requires other auxiliary functions, it will not be able to improve the user's game experience or even worsen the user's game experience since the game information can only provide the timer function.

Figure 13:
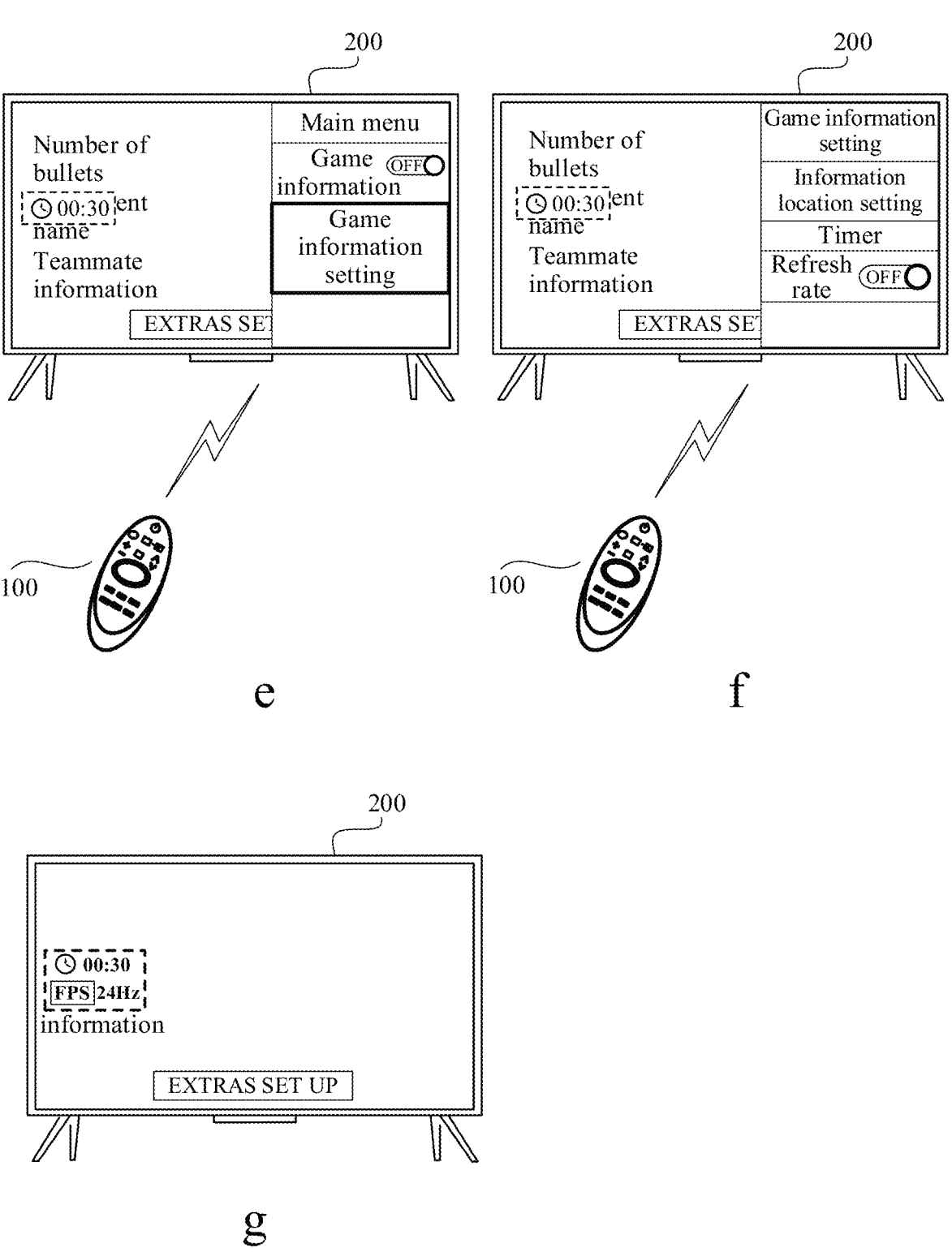
FIG. 13 illustrates a schematic diagram of interaction between a user and a display apparatus to adjust display items of game information according to some embodiments.

FIG. 13 illustrates a flow for adjusting the display item(s) of the game information between the user and the display apparatus, which will be discussed below.

Based on the main menu shown in FIG. 10, as shown in e in FIG. 13, by pressing the "up" and "down" buttons on the remote control, the focus is moved (shown in the thick black solid line box) to the option of game information setting, and by pressing the "confirm" button on the remote controller, a selection command is issued to the display apparatus 200 to display a game information menu corresponding to the option of game information setting on the current game interface, wherein the game information menu includes options of display items and an option of information location setting. The display items include items that can be displayed, such as the timer and the refresh rate, and may also include other display items, which are not limited in the embodiments.

As shown in f of FIG. 13, by pressing the "up" and "down" buttons on the remote control, the focus is moved (shown in the thick black solid line box) on a display item to be adjusted (a display item adjusted from non-display form to display form, adjusted from display form to non-display form), and by pressing the "confirm" button on the remote control, a first adjustment command is issued to the display apparatus 200 to turn on or off the switch corresponding to the display item. In this embodiment, taking adding a display refresh rate as an example, the focus (shown in the thick black solid line) is moved to the switch of refresh rate, and the switch is turned on to indicate that the refresh rate is displayed in the game information.

As shown in g in FIG. 13, the display apparatus 200, in response to the above-mentioned first adjustment command, adds the refresh rate of display item to the game information, and obtains the parameter corresponding to the current refresh rate, i.e., the target game information, e.g., 24 Hz, and at this time, the display region of the game information has not changed, and is still located in the first region. That is, the adjusted game information is displayed in the first region (shown in a dotted line box), and the adjusted game information includes the timer and the refresh rate.

In some embodiments, a specific parameter(s) of each display item can be further adjusted.

Figure 14:
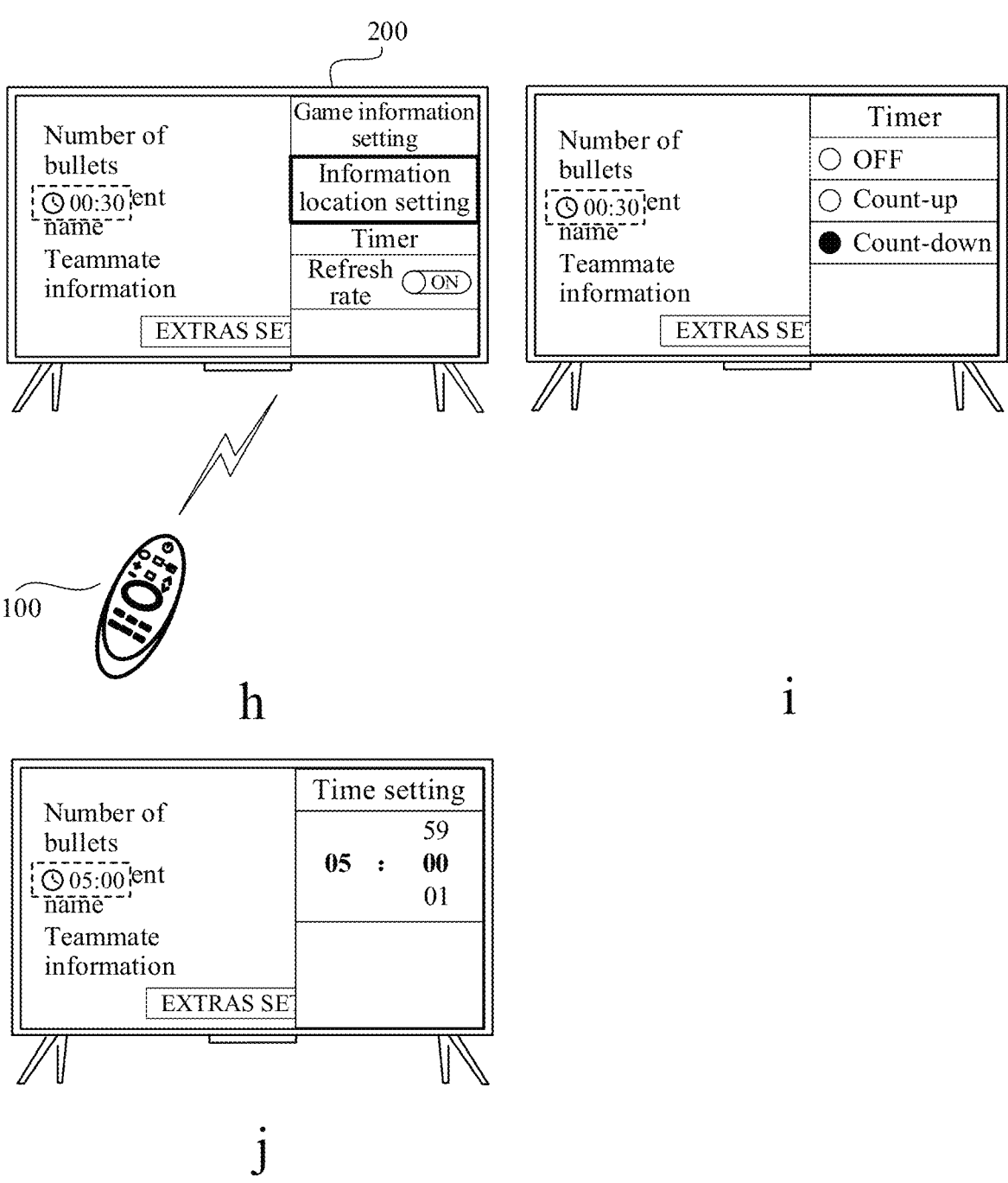
FIG. 14 illustrates a schematic diagram of interaction between a user and a display apparatus to adjust specific parameters of a timer according to some embodiments.

FIG. 14 illustrates a flow for adjusting the specific parameter(s) of the timer between the user and the display apparatus, which will be discussed below.

As shown in h in FIG. 14, on a game information setting menu, the focus is moved to the option of timer by manipulating the remote control, and selects this option, so that the display apparatus 200 displays a timer menu.

As shown in i in FIG. 14, the display apparatus 200 displays the timer menu, which includes a display switch option, a count-up option and a count-down option of the timer. The user can select the function of the timer by manipulating the remote control, wherein, if the count-up option is selected, the timer has the function of counting up, if the count-down is selected, the timer has the function of counting down. Further, if the user selects the count-up function, the timer starts from 0 and counts forward to remind the user of the duration of the game. If the user selects the count-down function as shown by i in FIG. 14, the display apparatus 200 displays a time setting menu.

As shown in j in FIG. 14, the user can set the count-down duration by modifying the minutes and seconds regions on the time setting menu, e.g., set the minutes to 05 and the seconds to 00, that is, set the count-down duration to be 5 minutes. In this case, the timer presented in the first region starts counting down from 5 minutes.

The flow for adjusting the specific parameter(s) of the refresh rate through interaction between the user and the display apparatus will be discussed below.

On the game information setting menu, the user turns on a display switch option of refresh rate, and a setting option of the refresh rate will appear. By manipulating the remote control, the focus is moved to the setting option of the refresh rate, and this option is selected, so that the display apparatus 200 displays a refresh rate menu.

The display apparatus 200 displays the refresh rate menu, and the refresh rate menu includes selectable refresh rate values, e.g., 60 Hz, 90 Hz, and 120 Hz.

The user can adjust the refresh rate of the display apparatus 200 by selecting the refresh rate value on the refresh rate menu. For example, if the conditions of the network environment and the graphics card of the display apparatus 200 are good, it can be adjusted to a higher refresh rate to improve the smoothness and texture of the image; otherwise, it can be adjusted to a lower refresh rate to ensure the smoothness of the image, so as to ensure the normal display of the game image and avoid problems such as stuttering. Taking the adjusted refresh rate as 120 Hz as an example, the refresh rate displayed in the first region is 120 Hz.

Through the adjustment of the above display items, the display item(s) in the game information can be adjusted more flexibly, so that the auxiliary function(s) presented can better meet the real requirements of the user, so as to improve the user's game experience.

In this embodiment, as shown in FIG. 11, the game information is displayed in the first region, which not only covers the specified information in the first region, but also only includes the display item of timer, which cannot meet the auxiliary requirements of the user. In this case, it is necessary to adjust the display region and display item(s) of the game information at the same time.

Figure 15:
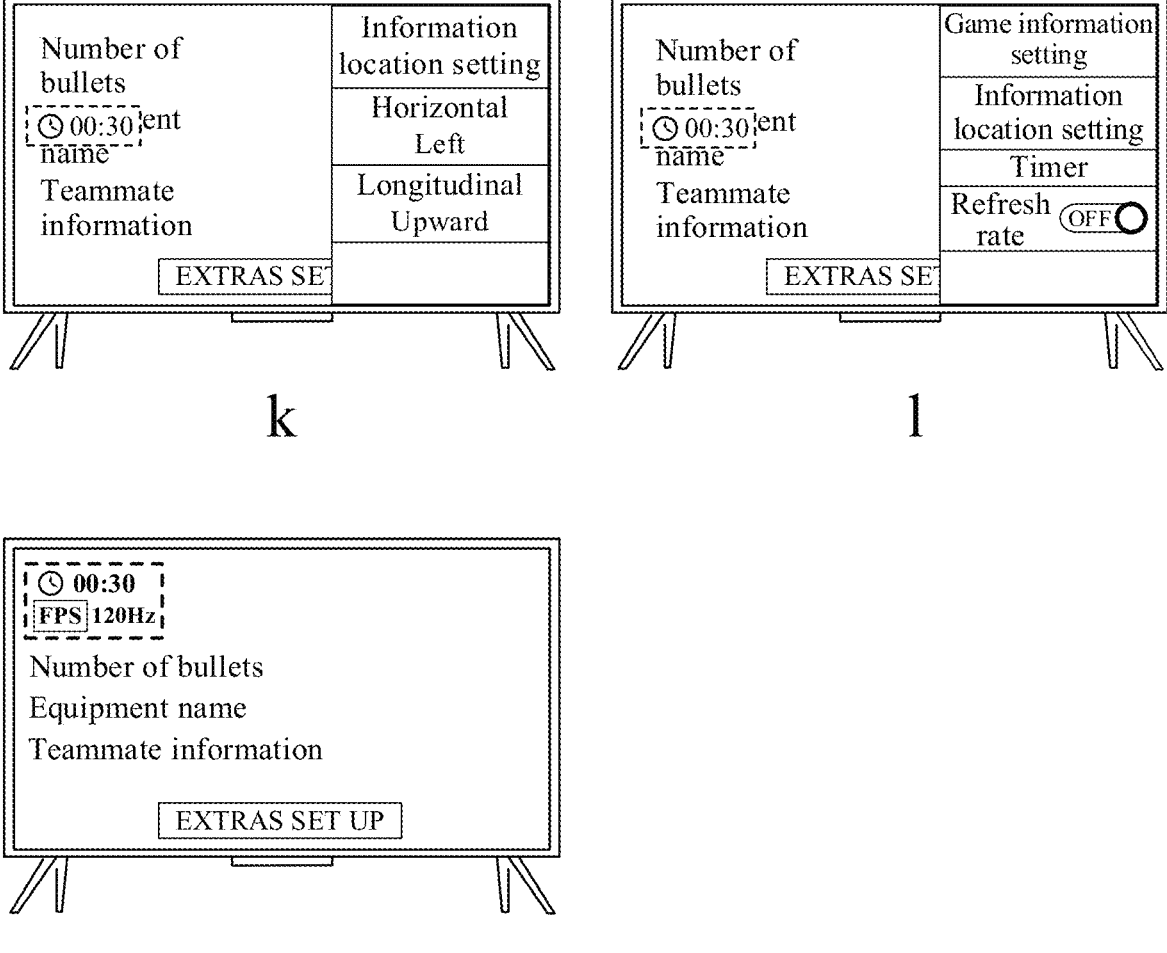
FIG. 15 illustrates a schematic diagram of interaction between a user and a display apparatus to adjust a display region and display items of game information according to some embodiments.

FIG. 15 illustrates a flow for adjusting the display region and display item(s) of game information between the user and the display apparatus, which will be discussed below.

Referring to the flow shown in a to d in FIG. 12, as shown in k in FIG. 15, the modifiable option for controlling the presentation in the horizontal direction is modified to left, and the modifiable option for controlling the presentation in the longitudinal direction is modified to up, that is, the display region of the game information is adjusted to the upper left region, i.e., the second region, on the game interface.

Returning to the game information menu as shown in b in FIG. 12, and referring to the flow shown in e to g in FIG. 13, as shown in 1 in FIG. 15, the display switch option of the refresh rate is turned on. Wherein, specific parameters of the timer and the refresh rate can be adjusted with reference to the flows disclosed above, for example, the timer is set to count down, and the count-down duration is 5 minutes, and the refresh rate is adjusted to 120 Hz.

The display apparatus 200 displays the game information by using the above-mentioned adjusted display parameters.

As shown in m in FIG. 15, the game information is shown in the second region (shown in the thick dotted line box). In this case, the game information includes the timer and the refresh rate, wherein the timer is a countdown and starts from 5 minutes, and the refresh rate is 120 Hz.

By adjusting the display region and display item(s) of the game information at the same time, the display location of the game information can be adjusted to not block the display region of the specified information, and the required display items can be set available for selection, thereby improving user's game experience.

The display apparatus 200 can be configured to display the adjusted game information in various manners, which will be discussed below.

Figure 16:
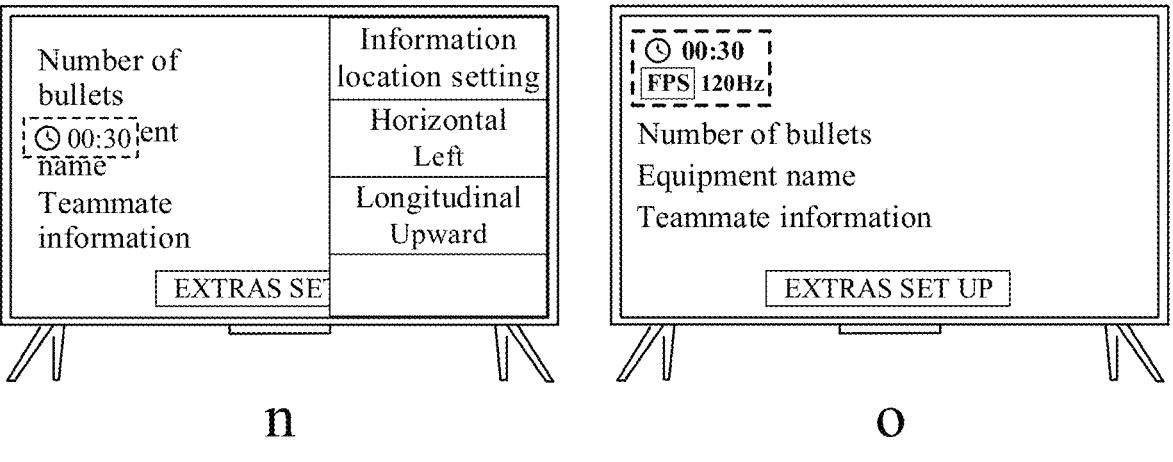
FIG. 16 illustrates a manner of displaying adjusted game information according to some embodiments.

In an embodiment, as shown in n in FIG. 16, when the user adjusts the display parameter(s) (display region and/or display item(s)) of the game information in the main menu, the game information displayed on the game interface does not change, that is, the game information is still located within the first region (shown in the dotted line box), and only the timer is displayed in the first region. The display apparatus 200 stores the adjusted display parameter(s). The user sends a command to close the main menu to the display apparatus 200, and the display apparatus 200, in response to the command, closes the main menu, calls the adjusted display parameter(s) that has been stored, and uses the adjusted display parameter(s) to display the game information. As shown in FIG. 16, the game information is displayed in the second region (shown in a thick dotted line box), the game information includes the timer and the refresh rate, wherein the timer is a countdown and starts from 5 minutes, and the refresh rate is 120 Hz.

Figure 17:
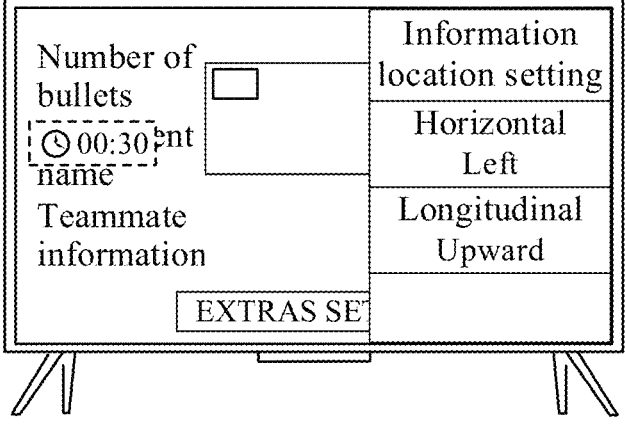
FIG. 17 illustrates a manner of displaying adjusted game information according to some embodiments.

In an embodiment, as shown in FIG. 17, when the user adjusts the display parameter(s) (display region and/or display item(s)) of the game information in the main menu, a preview interface is displayed, and the preview interface is used to present an effect of the adjusted game information. Taking the preview interface shown in FIG. 17 as an example, the preview interface is used to present the adjusted display region. In this case, the preview interface represents the game interface, and the display region represents the adjusted display region, i.e., the second region, which is represented by a region A. The adjusted display region is in the upper left on the game interface, and the region A is displayed on the upper left of the preview interface, so that the adjusted display region of game information can be displayed to the user, and the user can know the effect of the adjusted game information in time without closing the main menu. In this way, once the user is not satisfied with the adjusted effect, the adjustment can be sequentially performed based on the currently displayed main menu. The operation flow is more convenient and the effect is more intuitive.

Figure 18:
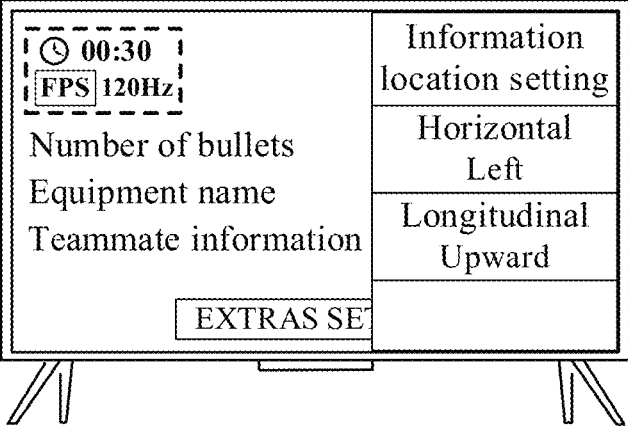
FIG. 18 illustrates a manner of displaying adjusted game information according to some embodiments.

In an embodiment, as shown in FIG. 18, when the user adjusts the display parameter(s) (display region and/or display item(s)) of the game information in the main menu, the game information is directly displayed on the game interface in real time with the adjusted display parameters. For example, when the display region is adjusted from the first region (shown in a dotted line box) to the second region (shown in a thick dotted line box), then when the main menu is displayed and after the display parameter(s) of the second region is set on the main menu, the game information is displayed in the second region of the game interface in real time. For example, the game information is displayed on the upper left of the game interface, and the game information includes the timer. In this way, the user can directly see the actual display effect of the game information after the display parameter(s) is adjusted, which improves the adjustment accuracy of the game information.

Figure 19:
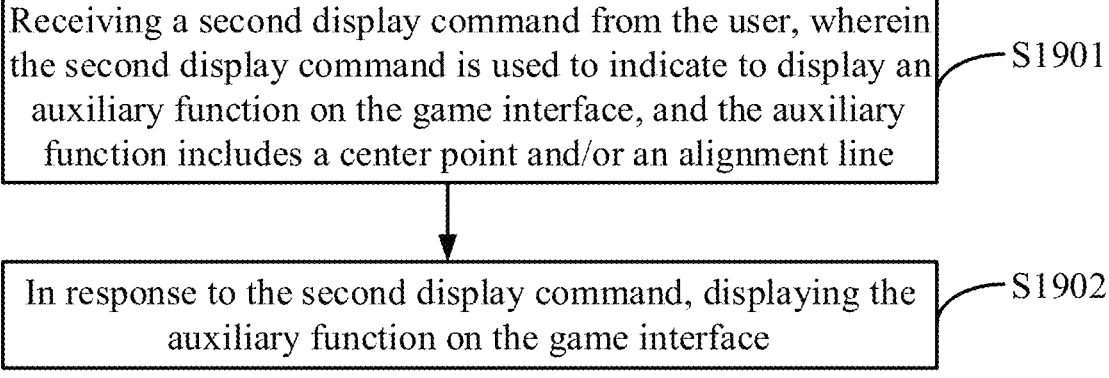
FIG. 19 illustrates a schematic flow diagram of a method for displaying auxiliary functions according to some embodiments.

Some auxiliary functions can be displayed on the game interface in the form of text . . . . Some auxiliary functions can be displayed on the game interface in the form of image, e.g., a center point, an alignment line, etc. These auxiliary functions can be displayed according to the flow shown in FIG. 19, which will be discussed below.

S1901, receiving a second display command from the user, wherein the second display command is used to indicate to display an auxiliary function on the game interface, the auxiliary function includes a center point and/or an alignment line, a geometric center of the game interface is displayed at the center point which represents a virtual visual center, and the alignment line is used to indicate a splicing position between screens which are adjacent to each other when the game interface is presented on a spliced multi-screen.

The user plays a game through the display apparatus 200, and in this case, the display apparatus 200 displays a game interface corresponding to game content of the game.

When a user requires an auxiliary function(s), he/she can send a second display command to the display apparatus 200 to make the display apparatus 200 display the auxiliary function, i.e., the center point, the alignment line, and the like. For example, the user may send the second display command to the display apparatus 200 through the control device 100, such as a remote controller or a mobile phone.

Correspondingly, the display apparatus 200 will receive the second display command from the user through an interface, a network, or the like.

S1902, in response to the second display command, displaying the auxiliary function on the game interface.

In this embodiment, the center point is used to indicate the virtual visual center. Usually, for some games, e.g., shooting games, the game content corresponding to the game interface is displayed from the perspective of the user's virtual visual center. The virtual visual center refers to the abstracted user's visual focus, which usually corresponds to the aiming point, observation point, etc., in the game. The user can adjust the position of the aiming point, observation point, etc., by manipulating an external mouse, game controller, infrared controller, etc., and the display apparatus 200, in response to the adjustment, recalculates a corresponding virtual visual center, and adjusts the game content displayed on the game interface based on the virtual visual center, specifically, displays the game content by taking the adjusted virtual visual center as the geometric center point on the game interface. In this way, the user can always observe the maximum range with the current viewing angle.

For some games, the center point is not displayed, which may lead to poor game experience. For example, the target to be aimed at is located at point A on the game interface, and the user adjusts the position of the aiming point to make that the display apparatus 200 adjust the game content corresponding to the display interface to take the target as the virtual visual center, but this adjustment is extremely prone to errors, that is, the adjusted virtual visual center actually corresponds to a point B on the game interface, and the point A and the point B are not the one same point, thus, the target is not currently aimed at, causing the user to fail to obtain the desired game result.

In this embodiment, the display apparatus 200 may display the center point on the game interface in response to the second display command from the user, so that the user can accurately know whether the target is aiming at on the current game interface according to the center point.

For example, the main menu may be shown on the display apparatus 200 with reference to the interaction flow shown in FIGS. 9 to 10, which will not be repeated here. In this embodiment, the main menu includes at least an option of center point.

Figure 20:
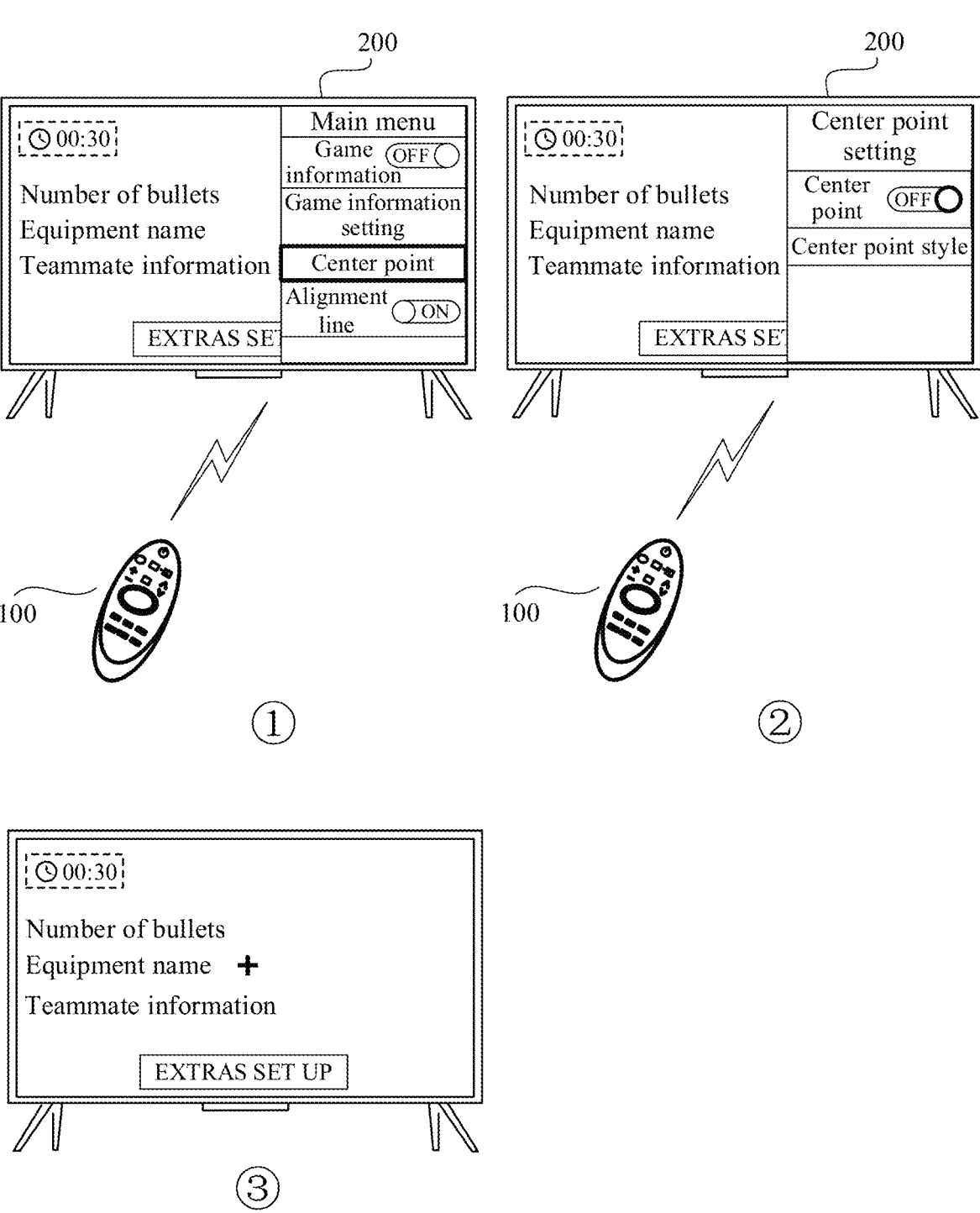
FIG. 20 illustrates a schematic diagram of interaction between a user and a display apparatus to display a center point according to some embodiments.

FIG. 20 illustrates a flow for displaying the center point between the user and the display apparatus, which will be discussed below.

As shown in ① in FIG. 20, by pressing the "up" and "down" buttons on the remote controller, the focus is moved (shown in a thick black solid line) to the option of center point, and by pressing the "confirm" button on the remote controller, a selection command is issued to the display apparatus 200 to indicate the display apparatus to display a center point setting menu.

As shown in ② in FIG. 20, the center point setting menu includes a switch option. By pressing the "up" and "down" buttons on the remote controller, the focus is moved (shown in a thick black solid line box) to the switch option, and by pressing the "confirm" button on the remote controller, a second display command is issued to the display apparatus 200 to display the center point.

As shown in ③ in FIG. 20, in response to the second display command, the display apparatus 200 turns on the switch option of the center point, and displays the center point on the geometric center point of the game interface.

Further, in another example, the specific parameter(s) of the center point may be adjusted. Based on the game interface shown in ② in FIG. 20, in this example, the center point setting menu also includes a center point style option. As shown in ④ in FIG. 21, by pressing the "up" and "down" buttons on the remote control, the focus is moved (shown in a thick black solid line) to the center point style option, and by pressing the "confirm" button on the remote control, a selection command is issued to the display apparatus 200 to indicate to display a center point style menu.

Figure 21:
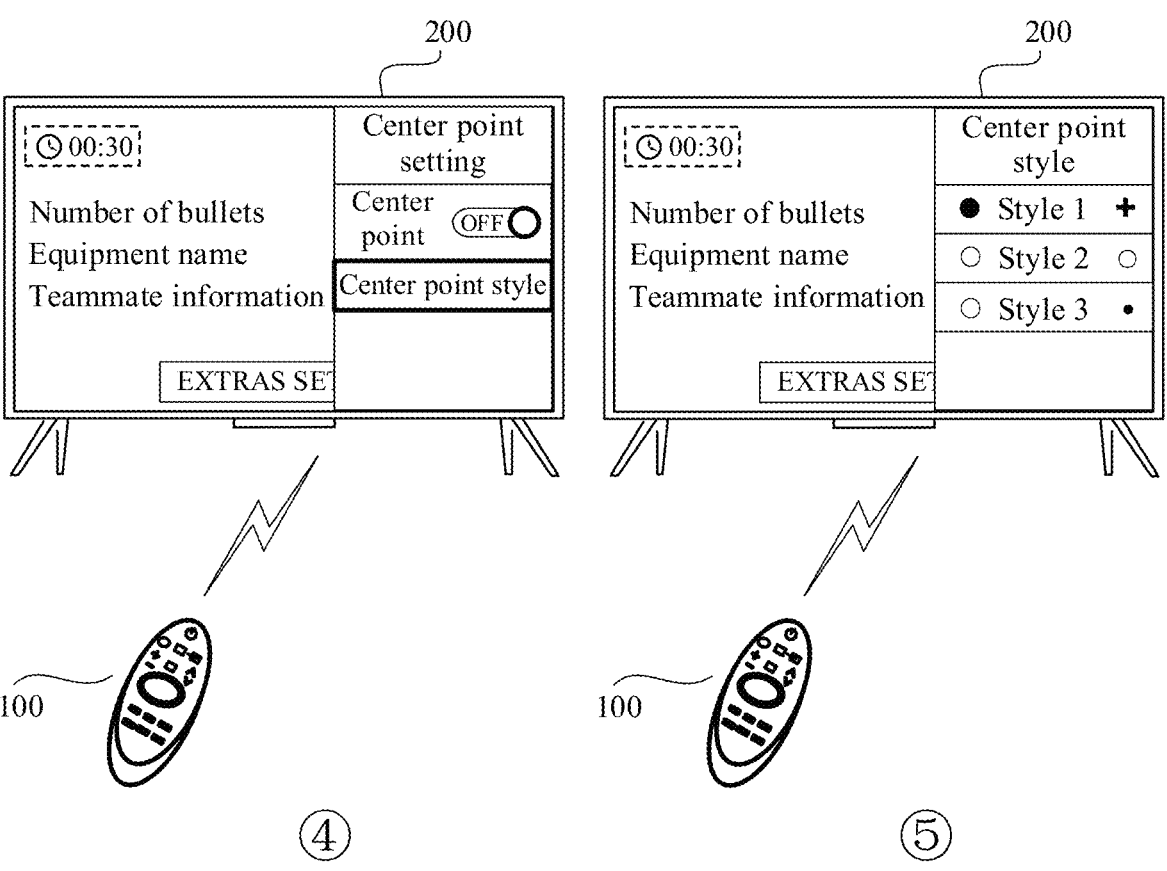
FIG. 21 illustrates a schematic diagram of an interaction between a user and a display apparatus to adjust a style of a central point according to some embodiments.

As described in ⑤ in FIG. 21, the center point style menu includes style options of the center point, such as style 1, style 2, and style 3. In an embodiment, specific naming may be defined by styles, such as "cross", "circle", and "point", and the user can know the specific style of the center point through the name of the style. In another embodiment, as shown in ⑥ in FIG. 21, a specific style image can be displayed behind the style name to display the center point more vividly, so that the user can select the preferred center point style more quickly. In this embodiment, by pressing the "up" and "down" buttons on the remote controller, the focus is moved (shown in a thick black solid line box) to the option of style 1, and by pressing the "confirm" button on the remote controller, a selection command is issued to the display apparatus 200 to present the center point in style 1.

In response to the selection command from the user, the display apparatus 200 displays the central point in style 1, as shown in ③ in FIG. 20, which will not be repeated here.

Through the above flow, the center point can be displayed on the game interface, so as to show user the current accurate aiming position through the center point, so as to improve the user's game experience.

In this embodiment, the game interface presented on a display apparatus is only a part of a complete game interface, that is, a complete game interface needs to be composed of multiple display apparatuses spliced together. When the multiple display apparatuses are seamlessly spliced together, due to the inconsistency of the image parameters of the game interfaces, e.g., the positions in the displayable range of the display, the display ranges of the game content corresponding to the game interfaces, etc., in the multiple display apparatuses, there may be misalignment at the splicing positions between the game interfaces of the multiple display apparatuses. Therefore, it is necessary to adjust the image parameters of the game interface in the display apparatuses to mitigate the problem such as the misalignment at the splicing positions between the game interfaces of the display apparatuses, so that the quality of the complete game interface after splicing is higher, so as to ensure the user's game experience. In this embodiment, the alignment lines are used to assist the splicing of the game interfaces between multiple display apparatuses. When the alignment lines between two adjacent game interfaces are aligned, there is no misalignment between the two adjacent game interfaces, and the splicing is completed.

In this embodiment, the display apparatus can, in response to the second display command from the user, display the alignment line on the game interface. In this way, the user can adjust the image parameters of the game interface according to the alignment line so that the game interface is aligned with the position of the adjacent game interface.

For example, the main menu may be shown on the display apparatus 200 with reference to the interaction flow shown in FIGS. 9 to 10, which will not be repeated here. In this embodiment, the main menu includes at least a switch option of alignment line.

Figure 22:
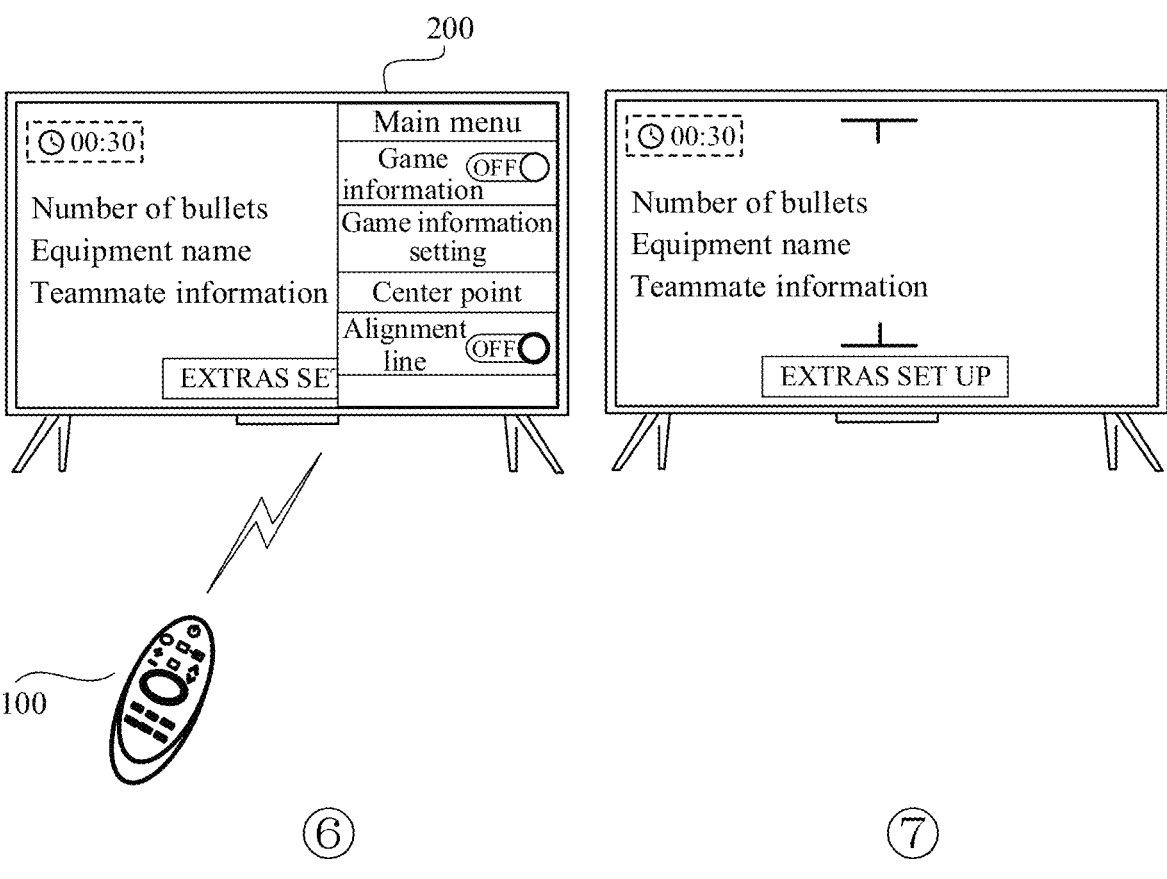
FIG. 22 illustrates a schematic diagram of an interaction between a user and a display apparatus to display alignment lines according to some embodiments.

FIG. 22 illustrates a flow for displaying an alignment line(s) between the user and the display apparatus, which will be discussed below.

As shown in ⑥ in FIG. 22, by pressing the "up" and "down" buttons on the remote control, the focus is moved (shown by a thick black solid line) to an switch option of the alignment line, and by pressing the "confirm" button on the remote control, the second display command is issued to the display apparatus 200 to display the alignment line on the game interface.

As shown in ⑦ in FIG. 22, in response to the second display command, the display apparatus 200 turns on the switch option of the alignment line, and displays the alignment line(s) on the game interface.

Through the above flow, the alignment line(s) can be displayed on the game interface, so that the user can adjust the image parameters of the game interface through the alignment line(s), so that the adjusted game interface can be aligned with the adjacent game interface, thereby improving the quality of the complete game interface after splicing and improving the user's game experience.

The display apparatus 200 can be configured to display auxiliary functions in various modes, which will be discussed below.

In an implementation, referring to the manner of displaying the adjusted game information shown in FIG. 16, when the user sets the auxiliary function(s) in the main menu, the auxiliary function(s) are not displayed on the game interface. The display apparatus 200 stores the auxiliary function(s) indicated in the second display command, and after closing the main menu, calls the auxiliary function(s) indicated in the second display command that has been stored to display the auxiliary function(s), e.g., the center point as shown in ③ in FIG. 20, or the alignment line as shown in ⑦ in FIG. 22, on the game interface.

In an implementation, referring to the manner of displaying the adjusted game information shown in FIG. 17, when the user sets the auxiliary function(s) in the main menu, a preview interface is displayed, and the preview interface is used to present the display effect of the auxiliary function.

The display apparatus 200 stores the auxiliary function(s) indicated in the second display command, and after closing the main menu, calls the auxiliary function indicated in the second display command that has been stored to display the auxiliary function(s), e.g., the center point as shown in ③ in FIG. 20, or the alignment line as shown in ⑦ in FIG. 22, on the game interface.

In an implementation, referring to the manner of displaying the adjusted game information shown in FIG. 18, when the user sets the auxiliary function(s) in the main menu, the auxiliary function(s) are directly displayed on the game interface in real time.

In some embodiments, the user usually turns on the alignment line before playing the game, so as to adjust the splicing positions between the game interfaces of the display apparatuses 200 and provide better image quality for the subsequent game. After the adjustment and before starting the game, the alignment line function is turned off, so as to avoid the alignment line on the game interface from interfering with the gaming process.

In some embodiments, there is no sequential relationship between adjusting the display parameter(s) of the game information and displaying the auxiliary function(s), and the two can be set at the same time, that is, the game information and the auxiliary function(s) can be displayed at the same time, and the display parameter(s) and specific parameter(s) of the game information as well as the specific parameter(s) of the auxiliary function can be further adjusted. Of course, the two can also be set separately, that is, only the game information is displayed or only the auxiliary function is displayed, or only the display parameter(s) and specific parameter(s) of the game information are adjusted or only the specific parameter(s) of the auxiliary function is adjusted.

It can be seen from the above embodiments that when the display apparatus receives the first display command from the user, the display apparatus displays the game information in the first region on the game interface, and after receiving a first adjustment command from the user, adjusts the display region and/or the display item(s) of the game information on the game interface. In this way, by adjusting the display parameter(s) of the game information, the display location of the game information can be adjusted to the display region that does not block the specified information, and the required display items can be available for selection, thereby improving the user's game experience. Moreover, the auxiliary function can be displayed to improve the user's game experience through assistance such as the center point and the alignment line.

Figure 23:
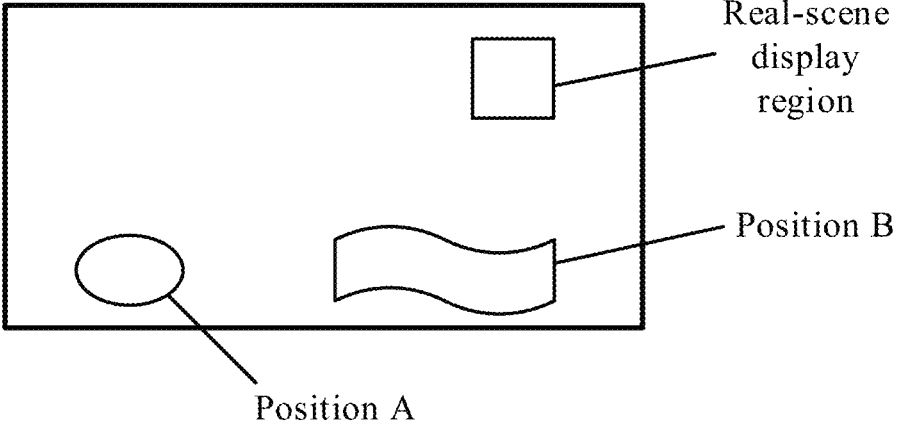
FIG. 23 illustrates a schematic diagram of a user interface according to some embodiments.

In order to improve the user's experience when using a smart TV to play an interactive game, a method for controlling a position of a controlled character through a gesture(s) is provided in the embodiments of the present application. This method is directed to a scenario where the position of the controlled character needs to be changed. For example, as shown in FIG. 23, the user can move the controlled character from position A to position B through the gesture(s), and the position of the controlled character on the display can be accurately determined through this method. In some embodiments, in addition to the game image, a real-scene display region can also be presented on the user interface, and in the real-scene display region, the image captured by the camera, or a partial image including the gesture image intercepted from the image can be displayed.

The method, as shown in FIG. 24, can include: S100, obtaining an image captured by a camera in real time, and recognizing a first gesture in the image. In the embodiments of the present application, the camera may be an external camera connected with the display apparatus, or may be a built-in camera directly set in the display apparatus. In this embodiments of the present application, the user can use the gesture(s) to adjust the position of the controlled character on the display. In some embodiments, when the recognized gesture is the first gesture, the controlled character can be controlled. Exemplarily, the first gesture can be to open the palm.

S200, based on that the first gesture in the image is recognized, determining a first gesture position of the first gesture. In some embodiments, a position of the palm center in the first gesture may be used as the first gesture position.

The method can further include: S300, determining a gesture recognition region. In the embodiments of the present application, the gesture recognition region can be in a certain proportion to the display interface of the display apparatus. Exemplarily, as shown in FIG. 25, the user needs to control the gesture to be displayed in the gesture recognition region, so that the gesture can control the movement of the controlled object. In the embodiments of the present application, when a user uses the gesture to control the controlled character, the movement of the controlled character on the entire display interface can be realized only by controlling the gesture to move in the gesture recognition region. In this way, the user can control the movement of the controlled character on the entire display interface only by moving the arm without large movements, which improves controllability and convenience.

In some embodiments, the gesture recognition region may be a gesture recognition region intercepted by using the center point of the image. Exemplarily, the center point of the gesture recognition region is the center point of the image, and the shape of the gesture recognition region can be a rectangle. In some other embodiments, the gesture recognition region may be a gesture recognition region intercepted by using the first gesture as a center point.

When the image taken by the camera is acquired, after a series of operations are performed to determine the first gesture position, S400, determining whether the first gesture position is within the gesture recognition region.

S500, if the first gesture position is not within the gesture recognition region, not generating a command, not moving the controlled character. S600, if the first gesture position is within the gesture recognition region, determining the position of the controlled character according to the first gesture position, and moving the controlled character shown on the display according to a position of the controlled character. In the embodiments of the present application, according to the first gesture position, the position of the controlled character on the display is determined, and the controlled character is moved to the position of the controlled character, finally realizing the goal of controlling the movement of the controlled character on the display with the gesture(s).

In some embodiments, according to the first gesture position, the step of determining the position of the controlled character can include: determining the first gesture position in a first coordinate system with the upper left corner of the image as the origin.

A second gesture position is obtained by converting the first gesture position into a second coordinate system with the center of the image as the origin. In some embodiments, after the image is taken, the first gesture position corresponding to the first gesture is calibrated based on the coordinate system with the upper left corner of the image as the origin, which is determined by the system. For the convenience of subsequent calculation and processing, the coordinate system can be converted into a coordinate system with the center of the image as the origin, and the gesture position is re-determined to obtain the second gesture position.

In some embodiments, the step of obtaining the second gesture position by converting the first gesture position into the second coordinate system with the center of the image as the origin can include:

$$P1 \cdot x = p \cdot x - X\blacktriangle - \text{width}/2;$$

$$P1 \cdot y = p \cdot y - Y\blacktriangle - \text{height}/2.$$

Wherein, $X\blacktriangle$=(videowidth−width)/2; $Y\blacktriangle$=(videoheight−height)/2; videowidth is a width of the image, width is a width of the gesture recognition region, videoheight is a height of the image, and height is a height of the gesture recognition region; P1.x is an abscissa of the second gesture position, p.x is an abscissa of the first gesture position, P1.y is an ordinate of the second gesture position, and p.y is an ordinate of the first gesture position.

After the second gesture position is determined, the second gesture position is converted to the user interface of the display to determine the position of the controlled character. In some embodiments, the step of converting the position of the second gesture to the user interface of the display to determine the position of the controlled character can include:

$$P2 \cdot x = P1 \cdot x * Tvwidth/\text{width};$$

$$P2 \cdot y = P1 \cdot y * Tvheight/\text{height}.$$

Wherein, P2.x is an abscissa of the position of the controlled character on the user interface, P1.x is an abscissa of the position of the second gesture, Tvwidth is a width of the user interface, width is the width of the gesture recognition region, and P2.y is an ordinate of the position of the controlled character on the user interface, P1.y is an ordinate of the second gesture position, Tvheight is a height of the user interface, and height is the height of the gesture recognition region.

In the embodiments of the present application, the movement of the controlled character can be precisely controlled to improve the user's experience.

Figure 26:
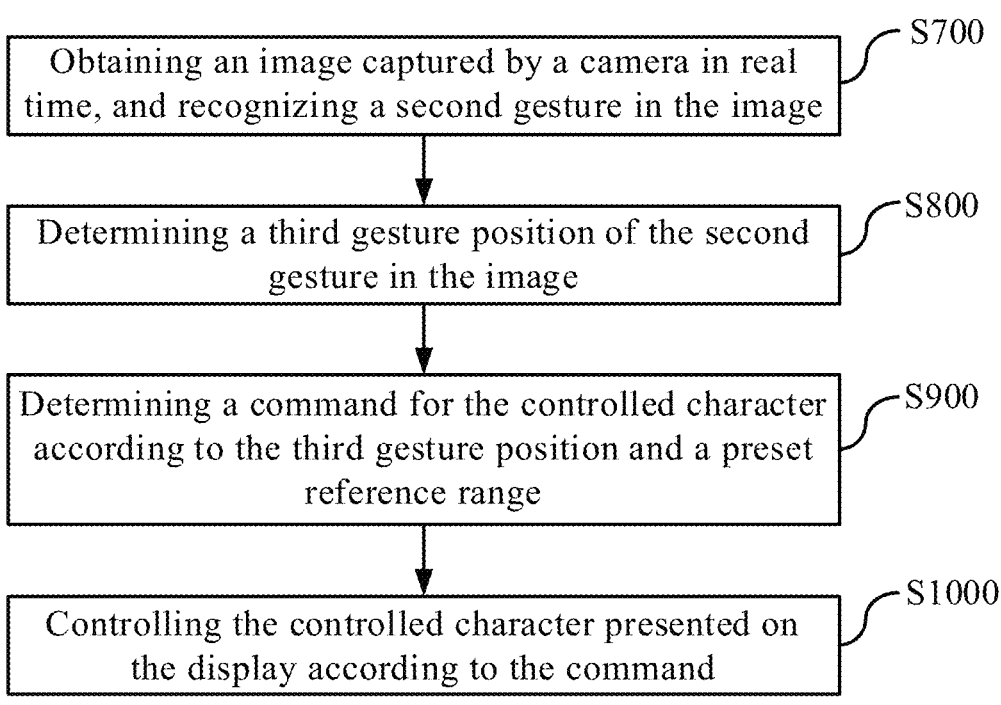
FIG. 26 illustrates a flowchart of another method for controlling a position of a controlled character through a gesture according to some embodiments.

Another method for controlling a position of a controlled character through a gesture(s) is also provided in the embodiments of the present application. This method is related to a scenario where the controlled character can be changed in movement speed, movement direction and action. As shown in FIG. 26, the method can include the following.

S700, obtaining an image captured by a camera in real time, and recognizing a second gesture in the image. S800, determining a third gesture position of the second gesture in the image. It should be noted that this step is similar to that of the other method in the above embodiment, and will not be repeated here.

S900, determining a command for the controlled character according to the third gesture position and a preset reference range. S1000, controlling the controlled character presented on the display according to the command. In the embodiments of the present application, the command for the controlled character is determined by comparing the third gesture position with the preset reference range and the relative position of the two.

In some embodiments, the step of determining the command for the controlled character according to the third gesture position and the preset reference range can include the following.

The preset reference range can include a preset longitudinal reference range. In the embodiments of the present application, the preset longitudinal reference range can refer to the limit of the preset reference range in the horizontal direction.

Determining whether the third gesture position is within the preset longitudinal reference range. In the embodiments of the present application, the controlled character may move in the horizontal direction, or may remain unchanged in the horizontal direction. The preset longitudinal reference range can provide error tolerance for a small shake of the user's hand.

Based on that the third gesture position is within the preset longitudinal reference range, it is determined that the command includes a static command, wherein the static command is used for indicating that the controlled character remains unchanged in the horizontal direction.

Based on that the third gesture position is not within the preset longitudinal reference range, it is determined that the command is a movement command.

In some embodiments, if the third gesture position is not within the preset longitudinal reference range, the step of determining that the command is the movement command can include the following. The controlled character can move left or right in the embodiments of the present application.

Figure 27:
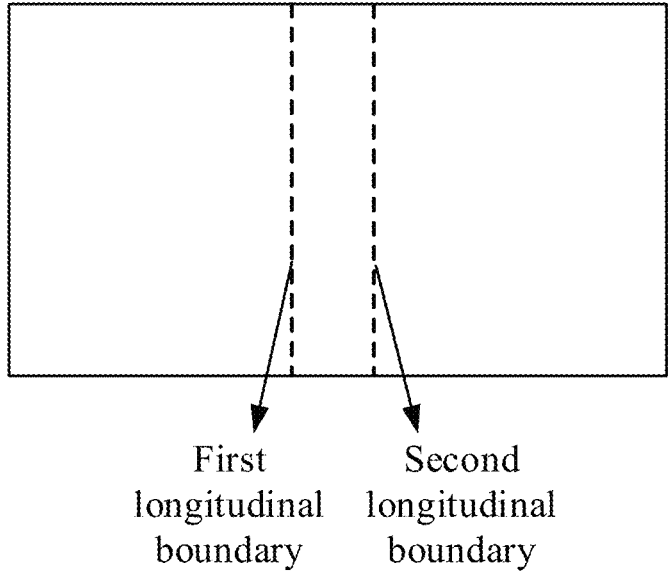
FIG. 27 illustrates a schematic diagram of a preset longitudinal reference range according to some embodiments.

As shown in FIG. 27, the preset longitudinal reference range can include a first longitudinal boundary and a second longitudinal boundary, and the second longitudinal boundary is on a right side of the first longitudinal boundary.

Based on that the third gesture position is on a right side of the second longitudinal boundary, it is determined that a movement direction indicated in the movement command is rightward; based on that the third gesture position is on a left side of the first longitudinal boundary, it is determined that a movement direction indicated in the movement command is leftward.

In some embodiments, when the controlled character is moving, a movement speed can also be changed. When the third gesture position is on the first longitudinal boundary, the movement speed of the controlled character is configured as a first movement speed; when the third gesture position is on the second longitudinal boundary, the movement speed of the controlled character is configured as a second movement speed.

When the third gesture position is on the right side of the second longitudinal boundary, a first distance between the third gesture position and the second longitudinal boundary is determined; and a movement speed in the movement command according to the first distance and the second movement speed is determined. In the embodiments of the present application, when the distance between the third gesture position and the second longitudinal boundary is larger, the speed of the rightward movement is faster, and the smaller the distance is, the slower the speed of the rightward movement is.

When the third gesture position is on the left side of the first longitudinal boundary, a second distance between the third gesture position and the first longitudinal boundary is determined; and the movement speed in the movement command according to the second distance and the first movement speed is determined. In the embodiments of the present application, when the distance between the third gesture position and the first longitudinal boundary is larger, the leftward movement speed is faster, and the smaller the distance is, the slower the speed of the leftward movement is.

In the embodiments of the present application, the controlled character can move not only in the horizontal direction, but also in the longitudinal direction. For example, the controlled character can perform operations such as jumping and squatting.

The method can further include the following. The preset reference range can further include a preset horizontal reference range. In the embodiments of the present application, the preset horizontal reference range can refer to the limit of the preset reference range in the longitudinal direction.

Determining whether the third gesture position is within the preset horizontal reference range. In the embodiments of the present application, the controlled character can move and change the action in the longitudinal direction, or keep the initial action unchanged. The preset horizontal reference range can provide error tolerance for a small or accidental shake of the user's hand. When the third gesture position is within the preset horizontal reference range, if the user's hand shakes slightly, it will not be deemed necessary to adjust the actions of the controlled character.

Figure 28:
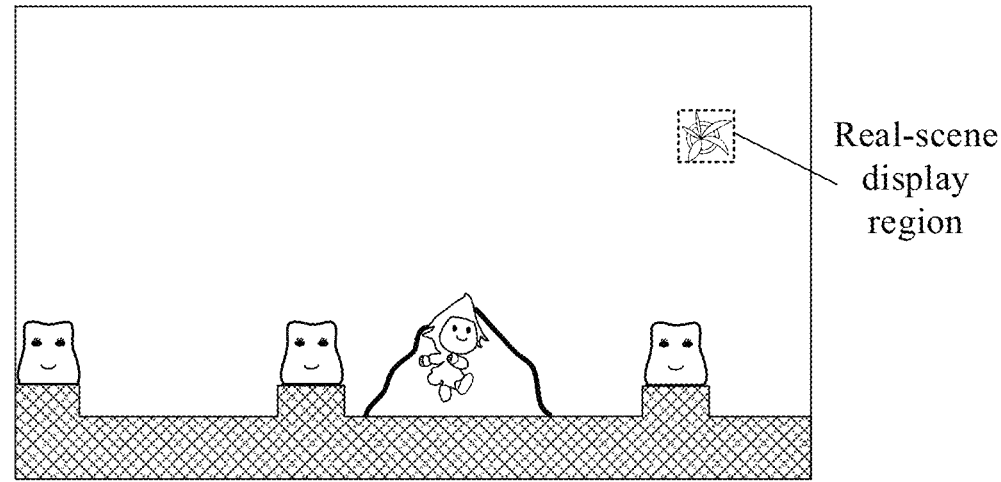
FIG. 28 illustrates a schematic diagram of another user interface according to some embodiments.

Based on that the third gesture position is within the preset horizontal reference range, it is determined that the command further includes an upright command. Exemplarily, as shown in FIG. 28, a real-scene display region may be presented in FIG. 28. In some cases, if the current third gesture position is within the preset longitudinal reference range at the same time, the controlled character can stand on the spot. If the current third gesture position is not within the preset longitudinal reference range, the controlled character can walk.

Figure 29:
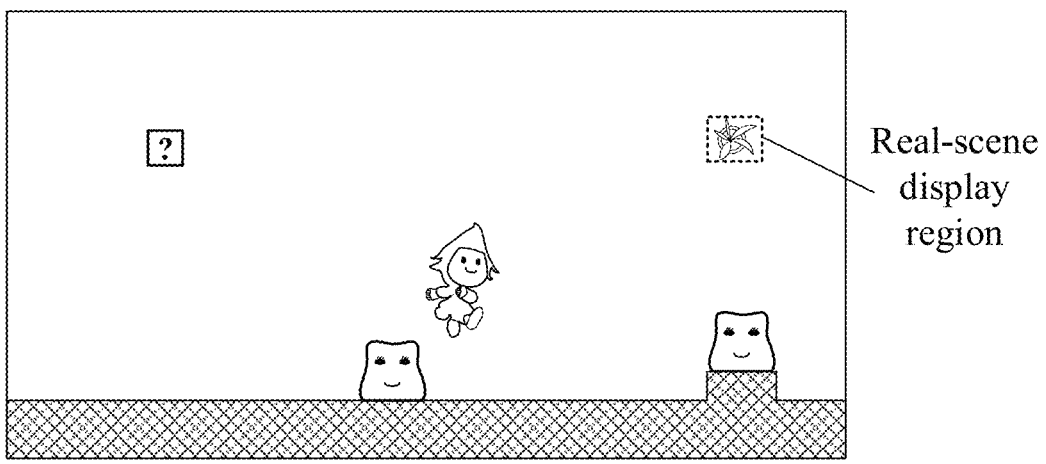
FIG. 29 illustrates a schematic diagram of yet another user interface according to some embodiments.

Based on that the third gesture position is not within the preset horizontal reference range, it is determined that the command further includes a command for changing movement. Exemplarily, the command for changing movement can make the controlled character jump upwards, or make the controlled character perform a squat operation or get down. As shown in FIG. 29, the controlled character performs an upward jumping action at this time.

In some embodiments, if the third gesture position is not within the preset horizontal reference range, the step of determining that the command can further include the command for changing movement will be discussed below.

Figure 30:
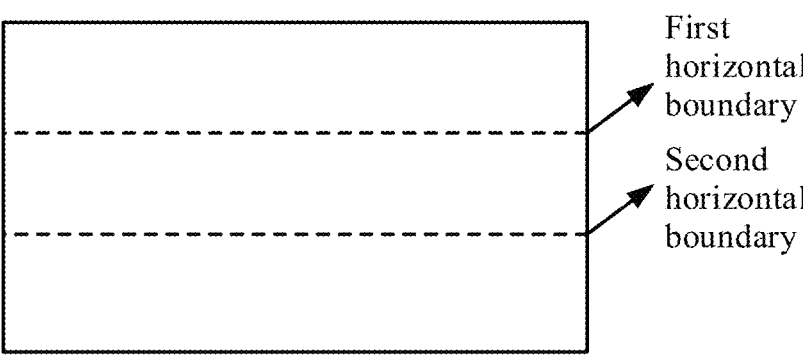
FIG. 30 illustrates a schematic diagram of a preset horizontal reference range according to some embodiments.

As shown in FIG. 30, the preset horizontal reference range can include a first horizontal boundary and a second horizontal boundary, and the second horizontal boundary is above the first horizontal boundary.

Based on that the third gesture position is above the second horizontal boundary, it is determined that the command for changing movement includes a jump command; based on that the third gesture position is below the first horizontal boundary, it is determined that the command for changing movement includes a lying down command or a squatting command.

In some embodiments, the method can further include the following. The preset horizontal reference range can further include a reference axis; the first horizontal boundary and the second horizontal boundary are on both sides of the reference axis, and have the same distance from the reference axis.

The step of determining the reference axis can include the following. In some embodiments, the position where the gesture is recognized at the beginning of the game is used as the reference axis, and when the command for changing movement is received, determining whether the command for changing movement continues to be received within a preset time duration; in response to the command for changing movement being not received any more, resetting the reference axis according to the current third gesture position. In the embodiments of the present application, considering that the user's hand might be fatigued when manipulating the controlled character, and will be slow displacement changes, the preset horizontal reference range is adjusted in real time. When the command for changing movement is not continuously received, the reference axis is reset according to the current third gesture position, Exemplarily, the horizontal position of the palm center in the third gesture position is set as the reference axis. Through the following example, the steps of determining the reference axis are explained in detail. When receiving the command for changing movement including a jump command, within Is, the recognized third gesture position does not change rapidly, that is, no command for changing movement is generated, then the reference axis is reset according to the current third gesture position. If within Is, the recognized third gesture position changes rapidly, that is, a command for changing movement is generated, the corresponding command is executed, and the reference axis is reset at this time. Then, continue detecting whether receiving a command for changing movement within Is, and repeat the above steps.

In some embodiments, the reference axis can also be set at a fixed position.

In some embodiments, the third gesture position is determined in a third coordinate system with the origin at the upper left corner of the image. For the convenience of calculation and subsequent processing, the step of determining the command for the controlled character according to the third gesture position and the preset reference range can include: obtaining a fourth gesture position by converting the third gesture position into a fourth coordinate system with the center of the image as the origin. In some embodiments, the step of obtaining the fourth gesture position by converting the third gesture position into the fourth coordinate system with the center of the image as the origin can include:

$$p4 \cdot x = p3.x - videowidth/2;$$

$$p4 \cdot y = p3.y - videoheight/2.$$

Wherein, p4.x is an abscissa of the fourth gesture position, p3.x is an abscissa of the third gesture position, videowidth is a width of the image, p4.y is an ordinate of the fourth gesture position, p3.y is an ordinate of the third gesture position, and videoheight is a height of the image.

Determining whether the fourth gesture position is within the preset longitudinal reference range.

Based on that the fourth gesture position is within the preset longitudinal reference range, it is determined that the command includes a static command, wherein the static command is used for indicating that the controlled character remains unchanged in the horizontal direction.

Based on that the fourth gesture position is not within the preset longitudinal reference range, it is determined that the command is a movement command.

In this embodiment, if the fourth gesture position is not within the preset longitudinal reference range, the step of determining that the command is the movement command can include the following.

The preset longitudinal reference range can include a first longitudinal boundary and a second longitudinal boundary, and the second longitudinal boundary is on the right side of the first longitudinal boundary.

Based on that the fourth gesture position is on the right side of the second longitudinal boundary, it is determined that a movement direction indicated in the movement command is rightward; based on that the fourth gesture position is on the left side of the first longitudinal boundary, it is determined that a movement direction indicated in the movement command is leftward.

In some embodiments, the horizontal axis of the coordinates takes rightward as the positive direction. The second longitudinal boundary is on the right side of the first longitudinal boundary, that is, the boundary value X1 of the second longitudinal boundary is greater than the boundary value −X1 of the first longitudinal boundary.

If the abscissa p4.x of the fourth gesture position is greater than the boundary value X1 of the second longitudinal boundary, that is, the fourth gesture position is on the right side of the second longitudinal boundary, it is determined that the movement direction in the movement command is to the right.

If the abscissa p4.x of the fourth gesture position is smaller than the boundary value −X1 of the first longitudinal boundary, that is, the fourth gesture position is on the left side of the first longitudinal boundary, it is determined that the movement direction in the movement command is to the left.

If the abscissa p4.x of the fourth gesture position is not greater than the boundary value X1 of the second longitudinal boundary and not smaller than the boundary value −X1 of the first longitudinal boundary, that is, the fourth gesture position is within the longitudinal reference range, it is determined that the command includes a static command.

In this embodiment, when the abscissa of the fourth gesture position is greater than the boundary value of the second longitudinal boundary, the first distance between the fourth gesture position and the second longitudinal boundary is determined, and the movement speed in the movement command the movement direction in which is to the right is determined according to the first distance and the second movement speed.

When the fourth gesture position is on the first longitudinal boundary, the movement speed of the controlled character is configured as the third movement speed V1, and when the fourth gesture position is on the second longitudinal boundary, the movement speed of the controlled character is configured as the fourth movement speed V2. The step of determining the movement speed in the movement command the movement direction in which is to the right according to the first distance and the second movement speed can include:

$$S1 = p4 \cdot x - X1;$$

$$V' = V2 + (V3 - V2) * S1/(videowidth/2 - X1).$$

Wherein, S1 is the first distance, p4.x is the abscissa of the fourth gesture position, X1 is the boundary value of the second longitudinal boundary; V" is the movement speed of the movement command which indicates to the right, V2 is the fourth movement speed, videowidth is the width of the image, and V3 is the preset maximum speed to the right. When the abscissa in the fourth gesture position is less than the boundary value of the first longitudinal boundary, a second distance between the fourth gesture position and the first longitudinal boundary is determined, and the movement speed in the movement command the movement direction in which is to the left according to the second distance and the first movement speed by the following:

$$S2 = |p4 \cdot x - (-X1)|;$$

$$V'' = V1 + (V4 - V1) * S2/(videowidth/2 - X1).$$

Wherein, S2 is the second distance, p4.x is the abscissa of the fourth gesture position, −X1 is the boundary value of the first longitudinal boundary; V" is the movement speed of the movement command which indicates to left, and V1 is the third movement Speed, videowidth is the width of the image, and V4 is the preset maximum speed to the left.

In this embodiment, the longitudinal axis of the coordinates takes downward as the positive direction, and the second horizontal boundary is above the first horizontal boundary, that is, the boundary value −Y1 of the second horizontal boundary is smaller than the boundary value Y1 of the first horizontal boundary.

If the ordinate of the fourth gesture position is smaller than the boundary value of the second horizontal boundary, it is determined that the command for changing movement includes a jump command.

If the ordinate of the fourth gesture position is greater than the boundary value of the first horizontal boundary, it is determined that the command for changing movement includes a lying down command or a squatting command.

In the embodiments of the present application, it allows for precisely controlling the movement direction, movement speed, and action changes of the controlled character, thereby improving the user's experience.

In the above embodiments, the method for controlling the position of the controlled character through the gesture(s) and the display apparatus are provided. The method according to the embodiments of the present application can accurately control the movement of the controlled character and show it on the display, improving the user's experience. The method can include: obtaining an image captured by a camera in real time, recognizing a first gesture in the image, and determining a first gesture position of the first gesture; determining a gesture recognition region; and determining whether the first gesture position is within the gesture recognition region; and in response to the first gesture position being within the gesture recognition region, determining a position of a controlled character according to the first gesture position, and moving the controlled character presented on the display according to the position of the controlled character.

What is claimed is:

1. A display apparatus, comprising:
a display, configured for displaying an image from a broadcast system or an external device;
a communicating device, comprising one or more HDMI ports and configured for connecting with the external device;
at least one processor in connection with the display and the communicating device and configured to execute instructions to cause the display apparatus to perform:
receiving a first display command for displaying game information on an game interface from a user, wherein the game interface is associated with game content input via a HMDI port;
in response to the first display command, displaying the game information in a first region of the game interface, wherein the game information covers a first portion of game content corresponding to the first region;
receiving a first adjustment command for adjusting a display parameter of the game information from the user, wherein the display parameter comprises a display region and/or a display item; and
in response to the first adjustment command, displaying the game information on the game interface by using the adjusted display parameter.

2. The display apparatus according to claim 1, wherein the first portion of the game content corresponding to the first region comprises specified information, the display parameter comprises the display region for indicating a second region, and the at least one processor is further configured to execute instructions to cause the display apparatus to perform:
in response to the first adjustment command, moving the game information from the first region to the second region for display, wherein a second portion of the game content corresponding to the second region does not comprise the specified information.

3. The display apparatus according to claim 2, wherein the second region is located at an upper left, a middle left, a lower left, an upper right, a middle right or a lower right on the game interface.

4. The display apparatus according to claim 1, wherein the display parameter comprises at least one display item, and the at least one processor is further configured to execute instructions to cause the display apparatus to perform:
in response to the first adjustment command, acquiring target game information corresponding to the at least one display item; and
displaying the target game information in the first region.

5. The display apparatus according to claim 1, wherein the display item comprises a timer and/or a refresh rate, wherein the timer is configured for a count-up function or a count-down function, and the refresh rate is configured to change in real time.

6. The display apparatus according to claim 1, wherein the first adjustment command is input based on a main menu presented on the game interface and comprising an item corresponding to the display parameter, and the at least one processor is further configured to execute instructions to cause the display apparatus to perform:
in response to the first adjustment command, displaying adjusted game information on the game interface after the main menu is closed, wherein the adjusted game information corresponds to the adjusted display parameter; or in response to the first adjustment command, displaying a preview interface above the game interface while the main menu is displayed, wherein the preview interface is used to present an effect of the adjusted game information; or in response to the first adjustment command, displaying the adjusted game information on the game interface while the main menu is displayed, wherein the adjusted game information corresponds to the adjusted display parameter.

7. The display apparatus according to claim 1, wherein the at least one processor is further configured to execute instructions to cause the display apparatus to perform:

receiving a second display command for displaying an auxiliary function on the game interface, the auxiliary function comprises a center point for indicating a geometric center of the game interface displayed and/or an alignment line for indicating a splicing position between screens which are adjacent to each other when the game interface is presented in a spliced multi-screen mode; and in response to the second display command, displaying the auxiliary function on the game interface.

8. The display apparatus according to claim 7, wherein the auxiliary function comprises the center point, and the at least one processor is further configured to execute instructions to cause the display apparatus to perform:

receiving a second adjustment command for indicating a target style of the center point; and in response to the second adjustment command, changing a style of the center point to the target style.

9. The display apparatus according to claim 7, wherein the second display command is input based on a main menu presented on the game interface and comprising an item corresponding to the auxiliary function, and the at least one processor is further configured to execute instructions to cause the display apparatus to perform:

in response to the second display command, displaying the auxiliary function on the game interface after the main menu is closed; or in response to the second display command, displaying a preview interface above the game interface while the main menu is displayed, wherein the preview interface is used to present an effect of the displayed auxiliary function; or in response to the second display command, displaying the auxiliary function on the game interface while the main menu is displayed.

10. A method for a display apparatus, comprising:

receiving a first display command for displaying game information on an game interface from a user, wherein the game interface is associated with game content input via a HMDI port;

in response to the first display command, displaying the game information in a first region of the game interface, wherein the game information covers a first portion of game content corresponding to the first region;

receiving a first adjustment command for adjusting a display parameter of the game information from the user, wherein the display parameter comprises a display region and/or a display item; and in response to the first adjustment command, displaying the game information on the game interface by using the adjusted display parameter.

11. The method according to claim 10, wherein the first portion of the game content corresponding to the first region comprises specified information, the display parameter comprises the display region for indicating a second region, and the method comprises:

in response to the first adjustment command, moving the game information from the first region to the second region for display, wherein a second portion of the game content corresponding to the second region does not comprise the specified information.

12. The method according to claim 11, wherein the second region is located at an upper left, a middle left, a lower left, an upper right, a middle right or a lower right on the game interface.

13. The method according to claim 10, wherein the display parameter comprises at least one display item, and the method comprises:

in response to the first adjustment command, acquiring target game information corresponding to the at least one display item; and displaying the target game information in the first region.

14. The method according to claim 10, wherein the display item comprises a timer and/or a refresh rate, wherein the timer is configured for a count-up function or a count-down function, and the refresh rate is configured to change in real time.

15. The method according to claim 10, wherein the first adjustment command is input based on a main menu presented on the game interface and comprising an item corresponding to the display parameter, and the method comprises:

in response to the first adjustment command, displaying adjusted game information on the game interface after the main menu is closed, wherein the adjusted game information corresponds to the adjusted display parameter; or in response to the first adjustment command, displaying a preview interface above the game interface while the main menu is displayed, wherein the preview interface is used to present an effect of the adjusted game information; or in response to the first adjustment command, displaying the adjusted game information on the game interface while the main menu is displayed, wherein the adjusted game information corresponds to the adjusted display parameter.

16. The method according to claim 10, comprising:

receiving a second display command for displaying an auxiliary function on the game interface, the auxiliary function comprises a center point for indicating a geometric center of the game interface displayed and/or an alignment line for indicating a splicing position between screens which are adjacent to each other when the game interface is presented in a spliced multi-screen mode; and in response to the second display command, displaying the auxiliary function on the game interface.

17. The method according to claim 16, wherein the auxiliary function comprises the center point, and the method comprises:

receiving a second adjustment command for indicating a target style of the center point; and in response to the second adjustment command, changing a style of the center point to the target style.

18. The method according to claim 16, wherein the second display command is input based on a main menu presented on the game interface and comprising an item corresponding to the auxiliary function, and the method comprises:

in response to the second display command, displaying the auxiliary function on the game interface after the main menu is closed; or in response to the second display command, displaying a preview interface above the game interface while the main menu is displayed, wherein the preview interface is used to present an effect of the displayed auxiliary function; or in response to the second display command, displaying the auxiliary function on the game interface while the main menu is displayed.

\* \* \* \* \*